(12) United States Patent
Suzuki et al.

(10) Patent No.: US 10,673,366 B2
(45) Date of Patent: Jun. 2, 2020

(54) CONTROLLER OF MULTIPHASE ROTATING ELECTRIC MACHINE

(71) Applicant: DENSO CORPORATION, Kariya, Aichi-pref. (JP)

(72) Inventors: Takashi Suzuki, Kariya (JP); Hiroyasu Otake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/146,756

(22) Filed: Sep. 28, 2018

(65) Prior Publication Data

US 2019/0103828 A1    Apr. 4, 2019

(30) Foreign Application Priority Data

Oct. 2, 2017   (JP) .................................. 2017-192661

(51) Int. Cl.
| | |
|---|---|
| *H02P 6/14* | (2016.01) |
| *H02P 21/22* | (2016.01) |
| *H02P 27/08* | (2006.01) |
| *B62D 5/04* | (2006.01) |
| *H02M 7/5387* | (2007.01) |

(52) U.S. Cl.
CPC ............ *H02P 21/22* (2016.02); *B62D 5/0403* (2013.01); *B62D 5/046* (2013.01); *B62D 5/0463* (2013.01); *H02P 27/08* (2013.01); *B62D 5/0412* (2013.01); *H02M 7/53871* (2013.01)

(58) Field of Classification Search
CPC .... H02M 3/33507; H02P 6/085; H02P 27/06; H02P 21/20; H02P 5/00
See application file for complete search history.

(56) References Cited

U.S. PATENT DOCUMENTS

| | | | |
|---|---|---|---|
| 2016/0190972 A1* | 6/2016 | Mori ................. | H02M 7/53873 |
| | | | 318/490 |
| 2019/0047613 A1* | 2/2019 | Kano ...................... | H02P 25/03 |

FOREIGN PATENT DOCUMENTS

JP          4462207 B2     9/2007

\* cited by examiner

*Primary Examiner* — Karen Masih
(74) *Attorney, Agent, or Firm* — Knobbe, Martens, Olson & Bear, LLP

(57) ABSTRACT

A controller of a multiphase rotating electric machine has two inverters outputting an alternating current to two sets of windings, and a control section driving a motor by switching between a "two-system driving mode" supplying power from the two inverters to the two sets of winding and a "one-system driving mode" supplying power from one of the two inverters to the corresponding set of windings, The control section in the one-system driving mode changes at least one of a maximum amplitude and a current phase of the alternating current used in the two-system driving mode to compensate for a reluctance torque generated by a mutual inductance of the two sets of winding in the two-system driving mode.

9 Claims, 17 Drawing Sheets

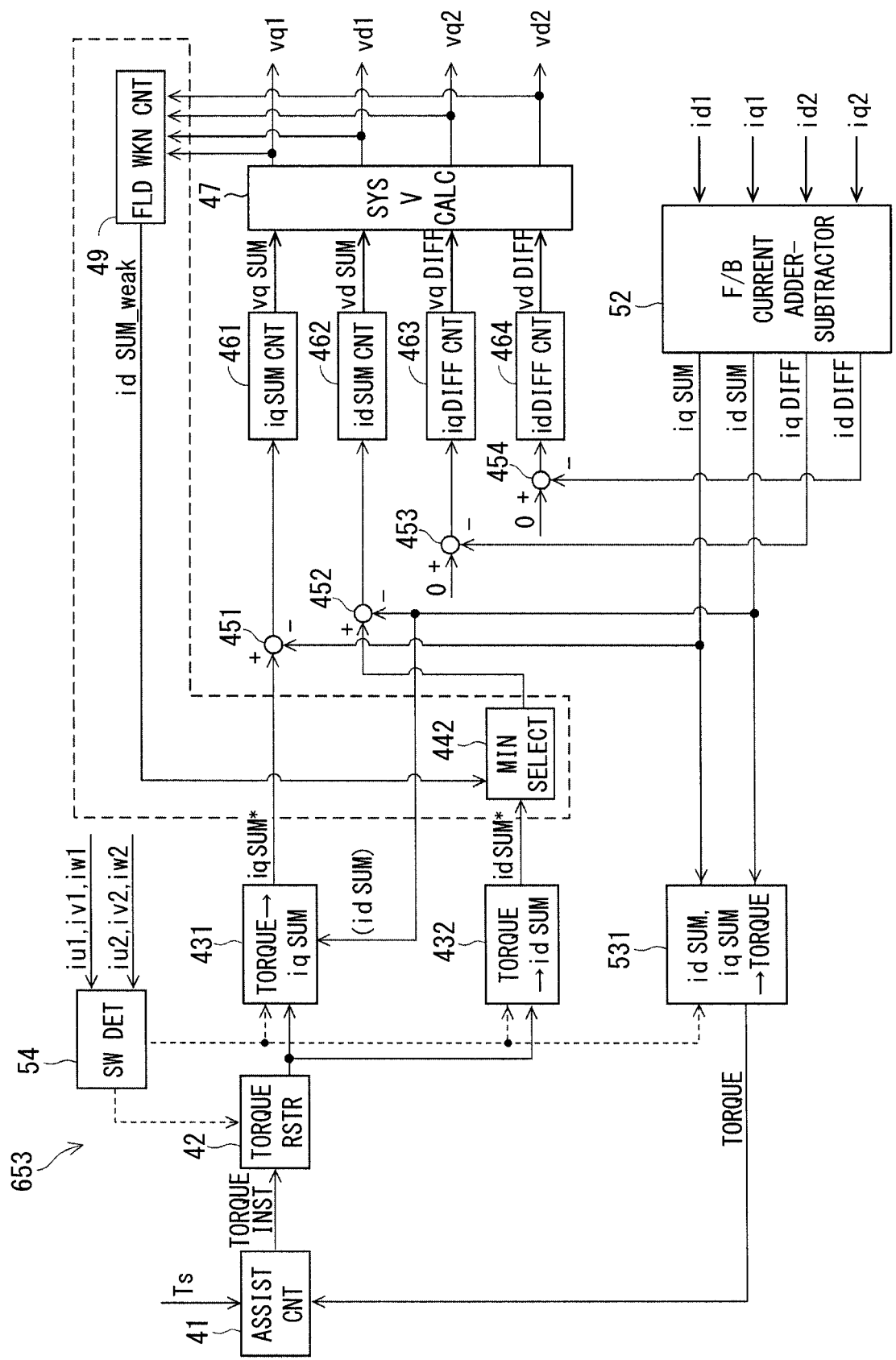

CONTROLLER OF MULTIPHASE ROTATING ELECTRIC MACHINE

CROSS REFERENCE TO RELATED APPLICATION

The present application is based on and claims the benefit of priority of Japanese Patent Application No, 2017-192661, filed on Oct. 2, 2017, the disclosure of which is incorporated herein by reference.

TECHNICAL FIELD

The present disclosure generally relates to a controller of a multiphase rotating electric machine.

BACKGROUND INFORMATION

Conventionally, in a vector control of a multiphase rotating electric machine (e.g., electric motor), an optimal dq-axis current instruction value is calculated based on a preset or desired condition. For example, the controller disclosed in Japanese Patent No. 4462207 changes a d-axis current instruction value and a q-axis current instruction value based on a target torque of the electric machine, to limit/prevent a current ripple at a field-weakening control time. That is, the dq-axis current amplitude and current phase are changed in such manner.

In general, when a d-axis inductance and a q-axis inductance are different from each other in a magnet-embedded-type rotating electric machine, a reluctance torque is generated based on the difference of the two inductances. Even in a magnet-exposed-type rotating electric machine, a nominal amount of inductance torque is generated in some cases. Therefore, the total torque output from the rotating electric machine is a combination of the magnet torque and the reluctance torque.

Based on the above, when driving a multiphase rotating electric machine that has two sets of windings with two power converters supplying power to the respective driving systems/windings, a two-system driving mode may be switched to a one-system driving mode when one of the systems fails. In the two-system driving mode, a reluctance torque is generated based on mutual inductance between the two sets of windings, while in the one-system driving mode, no reluctance torque is generated based on mutual inductance. Based on an assumption that the two systems have the same current amplitude, the magnet torque in the one-system driving mode has half the size of the magnet torque in the two-system driving mode, and the reluctance torque in the one-system driving mode is smaller than the reluctance torque of the two-system driving mode. As a result, the total torque of the one-system driving mode is smaller than half the total torque of the two-system driving mode. In other words, the total torque of the one-system driving mode is smaller than the torque of one of the systems in the two-system driving mode.

The current phase that maximizes the total torque is different in the two-system driving mode and in the one-system driving mode, even with the same current amplitude. In other words, a ratio between the d-axis current and the q-axis current is different in the two-system driving mode and in the one-system driving mode. As such, the optimal current phase in the two-system driving mode may not be usable for maximizing the total torque in the one-system driving mode.

SUMMARY

It is an object of the present disclosure to provide a controller of a multiphase rotating electric machine (e.g., an electric motor) having two systems that can efficiently generate an output torque in both a two-system driving mode and a one-system driving mode, where the total torque generated by the motor is a combination of the magnet torque and the reluctance torque.

In an aspect of the present disclosure, a controller of a multiphase rotating electric machine is disclosed that controls a power supply to a multiphase rotating electric machine with two sets of winding, where a total torque generated by the rotating electric machine may be a combination of a magnet torque and a reluctance torque. The controller may have a first power converter configured to supply an alternating current to a first set of windings, a second power converter configured to supply an alternating current to a second set of windings, and a control section.

A "system" may be used to refer to a power converter and its corresponding set of windings. A control section may switch between the "two-system driving mode," in which the two power converters supply power to the two sets of winding for driving the multiphase rotating electric machine, and the "one-system driving mode," in which one of the two power converters supplies power to a corresponding set of windings for driving the multiphase rotating electric machine, to control the power supply to the multiphase rotating electric machine. The control section is configured to change at least one of a maximum amplitude and a current phase of the alternating current in the one-system driving mode from the amplitude/phase of the alternating current in the two-system driving mode when driving the rotating machine in the one-system driving mode, to compensate for loss due to a reluctance torque generated by the mutual inductance of the two sets of winding in the two-system driving mode.

For example, the control section sets, in the one-system driving mode, an amplitude of the power supply current supplied to one set of winding to be greater than 50% of the maximum amplitude in the two-system driving mode. Alternatively, the control section changes, in the one-system driving mode, the current phase of the alternating current supplied to the one set of winding by changing the d-axis current and the q-axis current, from the current phase in the two-system driving mode.

In the present disclosure, by taking into consideration the difference between the per-system reluctance torques that are output from the rotating electric machine in the two-system driving mode and in the one-system driving mode, the maximum amplitude of the alternating current and/or the phase of the alternating current are set to a different value in respective modes. Therefore, in both of the two modes, the output torque from the multiphase rotating electric machine can be efficiently output.

In the two-system driving mode and in the one-system driving mode, the control section may switch at least one of (a) a calculation operation for calculating a d-axis current instruction from a torque instruction and (b) a calculation operation for calculating a q-axis current instruction from a torque instruction.

When performing the calculation operation for calculating the d-axis or q-axis current instruction from the torque instruction by referring to a map in the two-system driving mode and in the one-system driving mode, the control section may switch at least one of a torque—d-axis current map or a torque—q-axis current map. In such manner, an amount of power supply in the two-system driving mode and an amount of power supply in the one-system driving mode may be more easily and appropriately switched.

BRIEF DESCRIPTION OF THE DRAWINGS

Objects, features, and advantages of the present disclosure will become more apparent from the following detailed description made with reference to the accompanying drawings, in which:

FIG. 15 is a block diagram of a control section in a third embodiment of the present disclosure;

DETAILED DESCRIPTION

Embodiments of a controller for a multiphase rotating machine (e.g., an electric motor) are described with reference to the accompanying drawings. In each of the following embodiments, an electronic control unit (ECU) serves as "a controller of a multiphase rotating electric machine." The ECU may be used with an electric power steering (EPS) device of a vehicle to control a power supply to an electric power steering motor (e.g., a multiphase rotating electric machine) for generating a steering assist torque. The first to fourth embodiments may be collectively referred to as an "embodiment of the present disclosure." FIGS. 1-6 show configurations that are common to and shared by each of the first to fourth embodiments, as described in the following paragraphs.

Configuration of an Electric Power Steering Device

Figure 1:
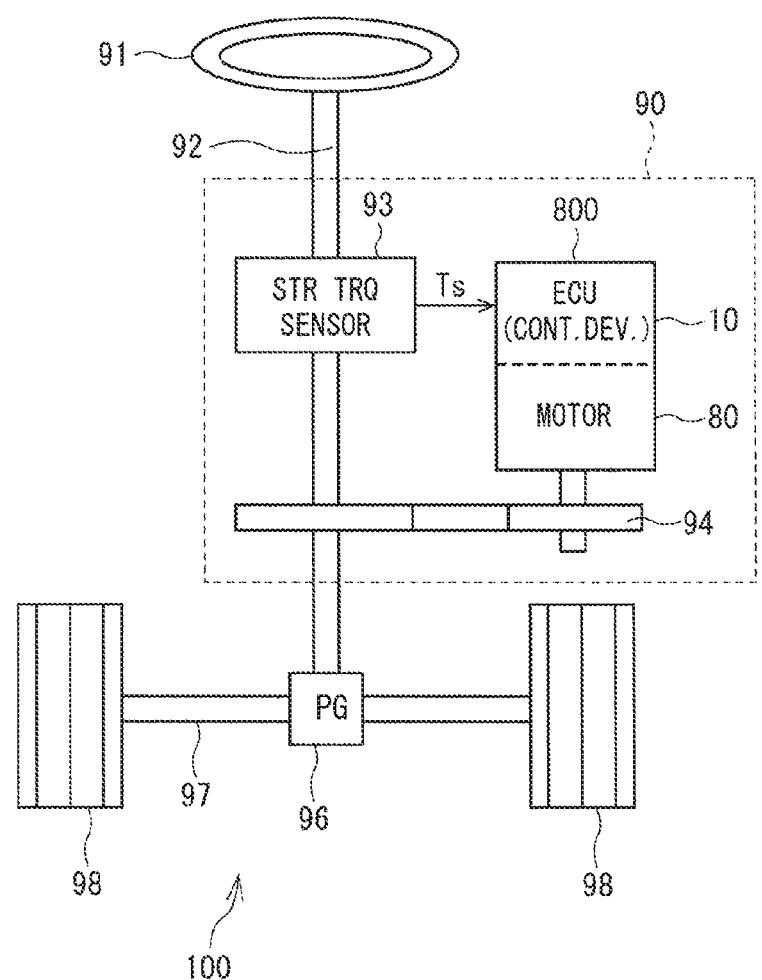
FIG. 1 illustrates a configuration of an electric power steering device having a controller of a multiphase rotating electric machine.

With reference to FIG. 1, the configuration of a steering system 100 includes an electric power steering device 90. FIG. 1 shows a singular package motor device 800 with an ECU 10 positioned on one axial side of a motor 80 packaged together as a singular unit or module. However, the present disclosure is not limited to a singular packaged motor device 800, and the motor 80 and ECU 10 may be in a separated configuration, for example, where the ECU 10 and the motor 80 are disposed separately and are connected by a wire harness. While the electric power steering device 90 shown in FIG. 1 is shown as a column-type EPS device, the EPS device 90 may also be a rack-type or rack-assist-type EPS device.

The steering system 100 includes a steering wheel 91, a steering shaft 92, a pinion gear 96, a rack shaft 97, wheels 98, as well as the electric power steering device 90. The steering shaft 92 is connected to the steering wheel 91. The pinion gear 96 is disposed at the tip of the steering shaft 92 and engages with the rack shaft 97. A pair of wheels 98 are disposed on both ends of the rack shaft 97 respectively via a tie rod or like component. When a driver rotates the steering wheel 91, the steering shaft 92 connected to the steering wheel 91 rotates. Rotational movement of the steering shaft 92 is converted to a linear, translational movement of the rack shaft 97 by the pinion gear 96, and the wheels 98 are steered or rotated to an angle based on a displacement amount of the rack shaft 97.

The electric power steering device 90 may include, for example, a steering torque sensor 93, the ECU 10, the motor 80, and a speed reduction gear 94. The steering torque sensor 93 is disposed in the middle of the steering shaft 92, and detects the steering torque Ts on the steering shaft as input via the steering wheel 91. That is, as a driver turns the steering wheel 91 that in turn turns the steering shaft 92, the steering torque Ts is detected by the steering torque sensor 93. The ECU 10 controls the drive of the motor 80 so that the motor 80 generates a desired assist torque based on the steering torque Ts. The assist torque output from the motor 80 is transmitted to the steering shaft 92 via the speed reduction gear 94.

Figure 2:
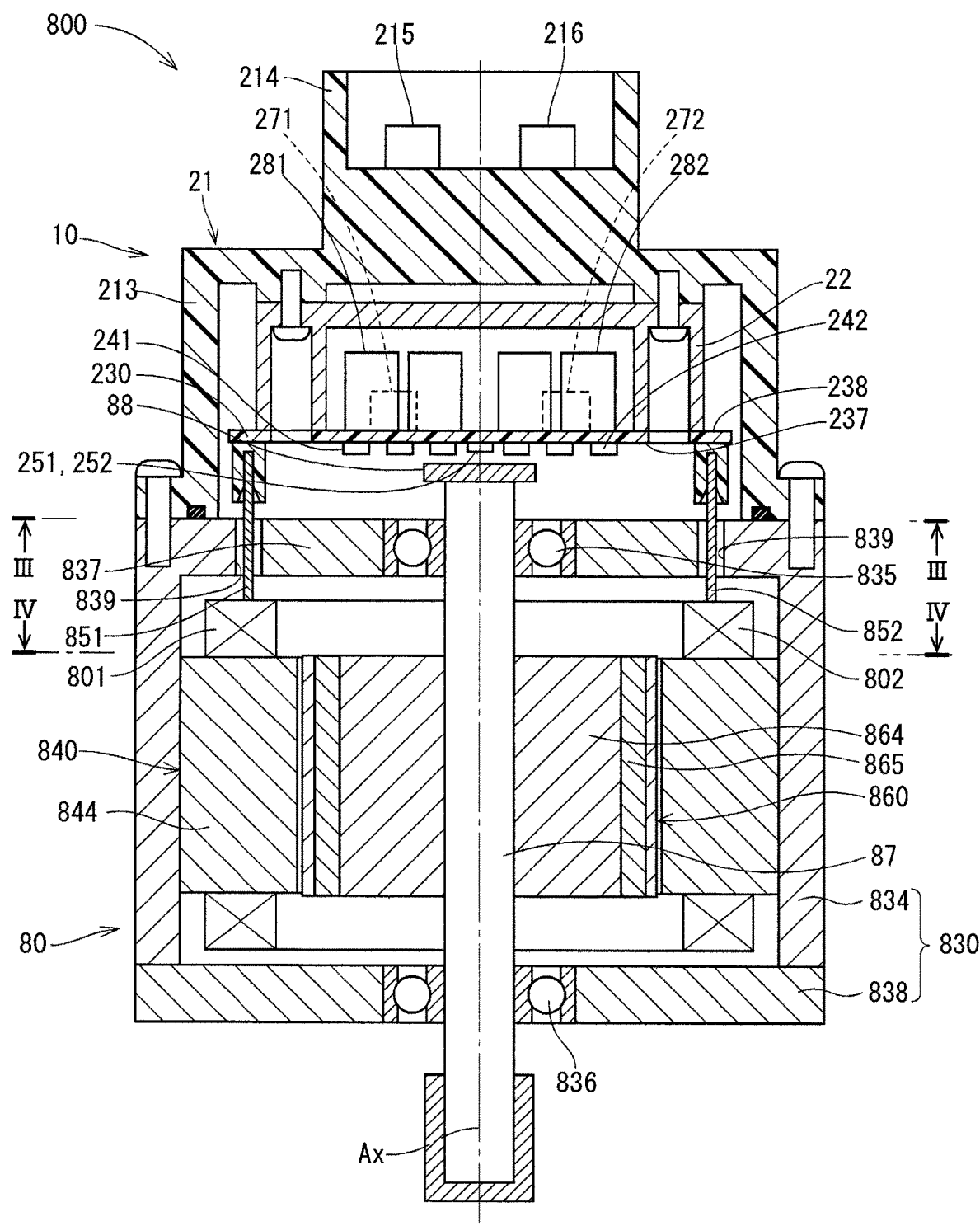
FIG. 2 is a cross-sectional view along a rotational/longitudinal axis of a controller-integrated motor with two systems.
Figure 3:
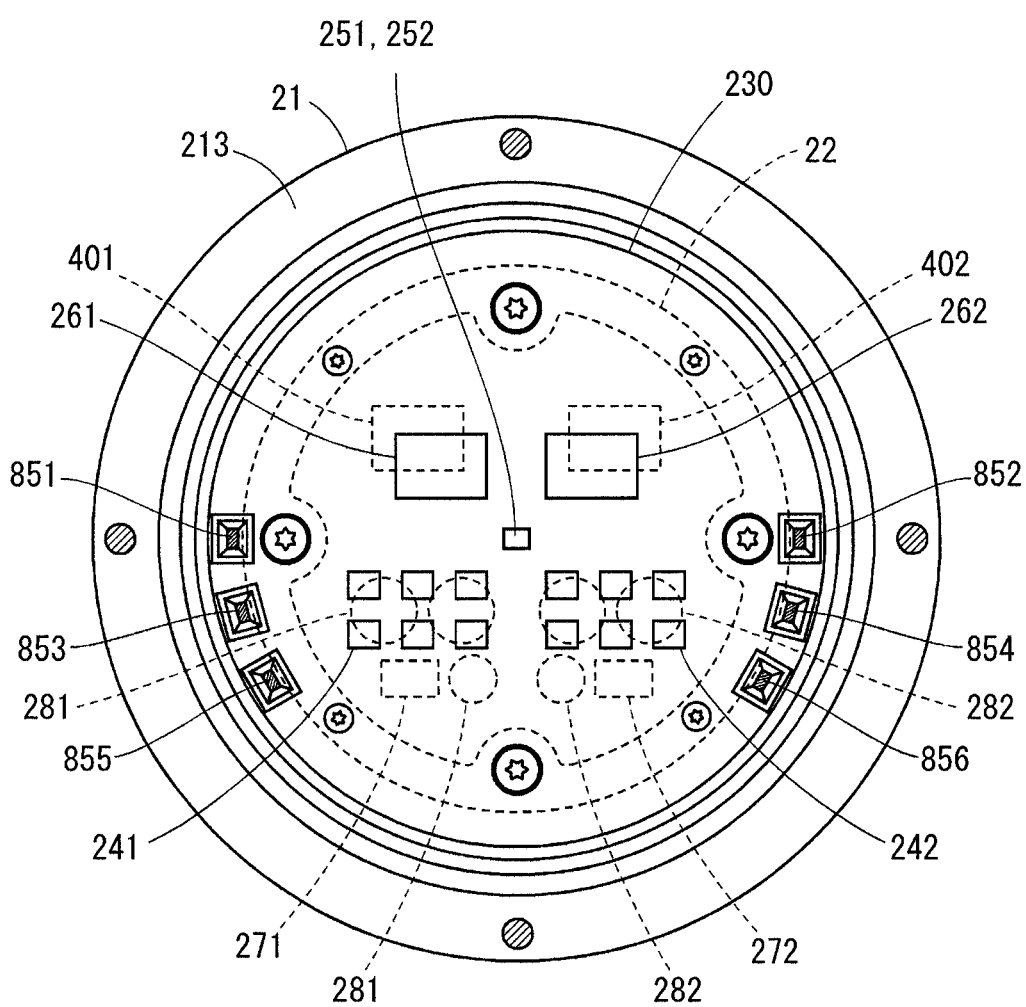
FIG. 3 is a cross-sectional view of the motor along a III-III line in FIG. 2.
Figure 4:
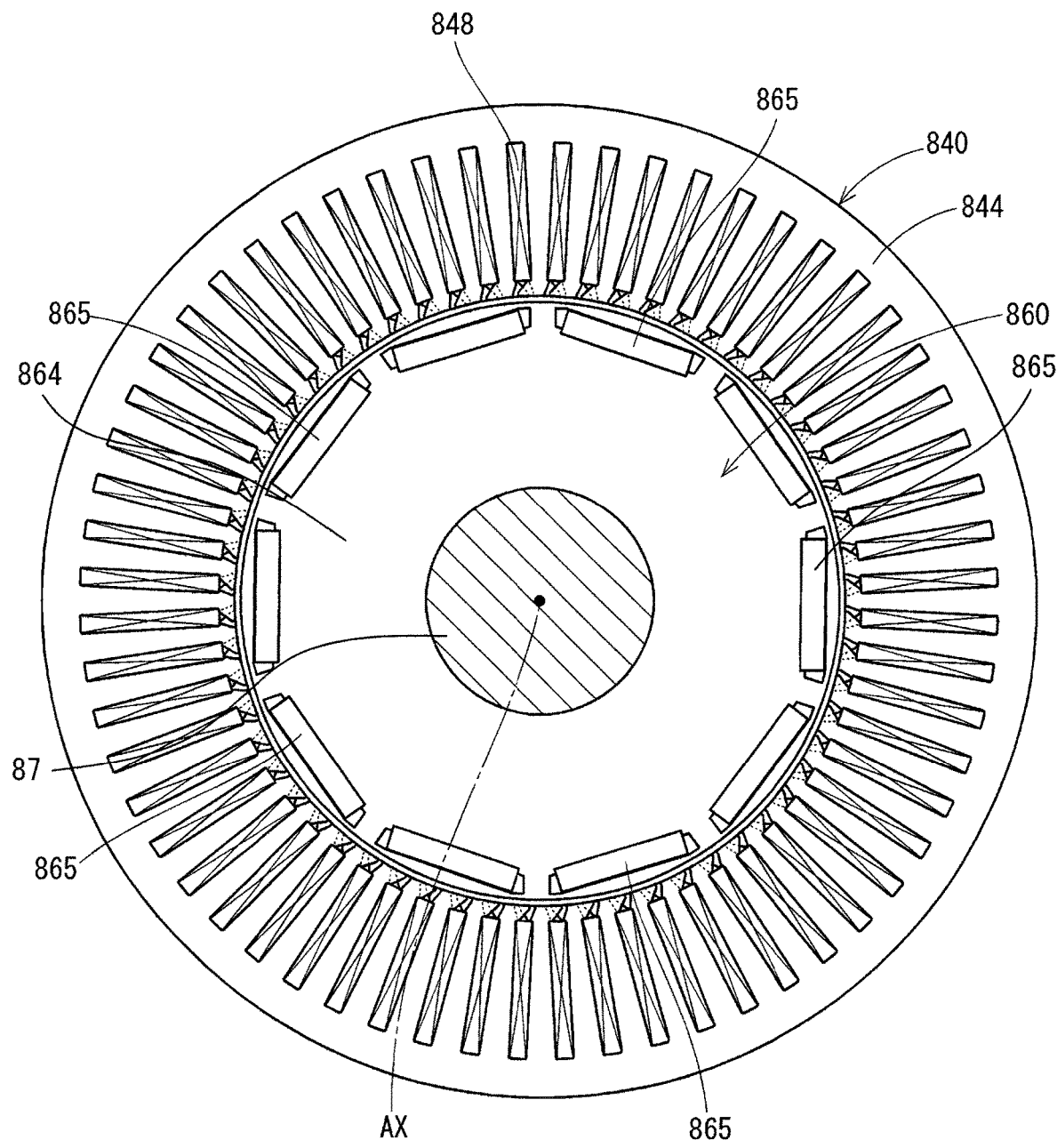
FIG. 4 is a cross-sectional view of the motor along a IV-IV line in FIG. 2 for a buried magnet configuration.

With reference to FIGS. 2-4, the configuration of the singular body type motor device 800 where the ECU 10 is integrated on or near one axial end of the motor 80 is described. In the cross-sectional view in FIG. 2, the ECU 10 is arranged coaxially with an axis Ax of a shaft 87 of the motor 80. The ECU 10 may be disposed at or near one end of the axis Ax, in this case, at the end of axis Ax that is opposite an output shaft side of the shaft 87 of the motor 80. However, the ECU 10 in the single package motor device 800 is not limited to such configuration may also be disposed on or near the output shaft side of the shaft 87 of the motor 80 in other embodiment(s). The motor 80 is a three-phase brushless motor, and is provided with a stator 840, a rotor 860, and a housing 830 that accommodates them. As used herein, "axial" may refer to the longitudinal axis or long axis of elements and features, unless described otherwise.

The stator 840 has a stator core 844 fixed to the housing 830, and two sets of three-phase windings 801 and 802 assembled to the stator core 844. Lead wires 851, 853, and 855 respectively extend from three-phase windings (e.g., U1, V1, W1) that make up the first winding 801. Lead wires 852, 854, and 856 respectively extend from three-phase windings (e.g., U2, V2, W2) that make up the second winding 802. Each phase winding is wound around each slot 848 of the stator core 844.

The rotor 860 has the shaft 87 supported by a rear bearing 835 and a front bearing 836, and has a rotor core 864 into which the shaft 87 is inserted. The rotor 860 is disposed within the stator 840 and is rotatable relative to the stator 840. The motor 80 of the present embodiment may be an embedded magnet type synchronous rotating machine such as an Interior Permanent Magnet Synchronous Motor (IP-MSM) in which many magnets 865 are embedded at a peripheral part of the rotor core 864. A permanent magnet 88 for detecting a rotation angle of the shaft 87 may be disposed at one end of the shaft 87.

The housing 830 has a cylinder-shaped case 834 with a rear frame end 837 and a front frame end 838. The case 834 and the front frame end 838 may be fastened to each other with a bolt or like fastener. The rear frame end 837 of the housing 830 may include lead wire insertion holes 839 through which the lead wires 851, 852 and other wires that connect to the windings 801 and 802 pass, where the wires further extend toward the ECU 10 to connect to a substrate 230.

The ECU 10 is provided with a cover 21 and a heat sink 22 fixed to the cover 21. The substrate 230 is fixed to the heat sink 22. Various kinds of electronic components may be mounted on the substrate 230. The cover 21 protects the electronic parts of the ECU 10 from an external shock, and/or prevents the ingress of dust and water into the ECU 10. The cover 21 has a cover area 213 and a connector area 214 where external connections may be made to feeder cables and signal cables. Terminals 215 and 216 in the connector area 214 may be used for receiving power supply from an external source (not illustrated). The terminals 215 and 216 may be connected to the substrate 230 via a non-illustrated electrical pathway.

The substrate 230 may be, for example, a printed circuit board, and may be disposed at a position that faces the rear frame end 837. Portions of the substrate 230 may also be fixed to the heat sink 22. On the substrate 230, the electronic components for the two systems may be disposed separately, that is, the electronic components for the first drive system may be disposed separately from the electronic components of the second drive system on the substrate 230. Although the substrate 230 in the present embodiment is provided as a single board, the substrate 230 may also be provided as two or more substrates/boards in other embodiments.

The substrate 230 has two sides, that is, a motor side 237 that faces the rear frame end 837 and a cover side 238 opposite to the motor side 237 that faces the heat sink 22.

A plurality of switching elements 241 and 242, rotation angle sensors 251 and 252, custom ICs 261 and 262, and other electronic components may be mounted on the motor side 237 of the substrate 230. There may be six switching elements 241 and 242 grouped together on the substrate 230 with each group configured to switch to provide electric power to the windings of one of the two systems. Twitching elements 241, 242 may be arranged as an upper arm and a lower arm of the three phases of a motor drive circuit in the present embodiment. That is, the switching elements 241, 242 may have elements arranged on a high side and low side of the inverters for providing electric power to the windings. The rotation angle sensors 251 and 252 are so arranged that they face the permanent magnet 88 disposed at the end of the shaft 87. The custom ICs 261 and 262 and microcomputers 401 and 402 collectively make up a control circuit of the ECU 10.

The microcomputers 401 and 402, capacitors 281 and 282, and inductors 271 and 272 and other electronic components are mounted on the cover side 238 of the substrate 230. Specifically, the first microcomputer 401 and the second microcomputer 402 are disposed separately, separated by a preset distance on the cover side 238 of the substrate 230. The capacitors 281 and 282 may be used to smooth the electric power from the power supply and limit and/or prevent noise caused by the switching operation of the switching elements 241 and 242 and/or by the operation of other components. The inductors 271 and 272 along with the capacitors 281 and 282 serve as filter circuits.

In the examples shown in FIG. 2 or FIG. 3, although two rotation angle sensors 251 and 252 and two microcomputers 401 and 402 are provided for each of the two systems, one sensor and one microcomputer may be shared by the two systems. That is, with reference to the example shown in FIG. 6, a rotation angle sensor 25 and a microcomputer 40 may be shared by the two systems, e.g., a first system of inverter 601 and windings 801, and a second system of inverter 602 and windings 802.

Figure 5:
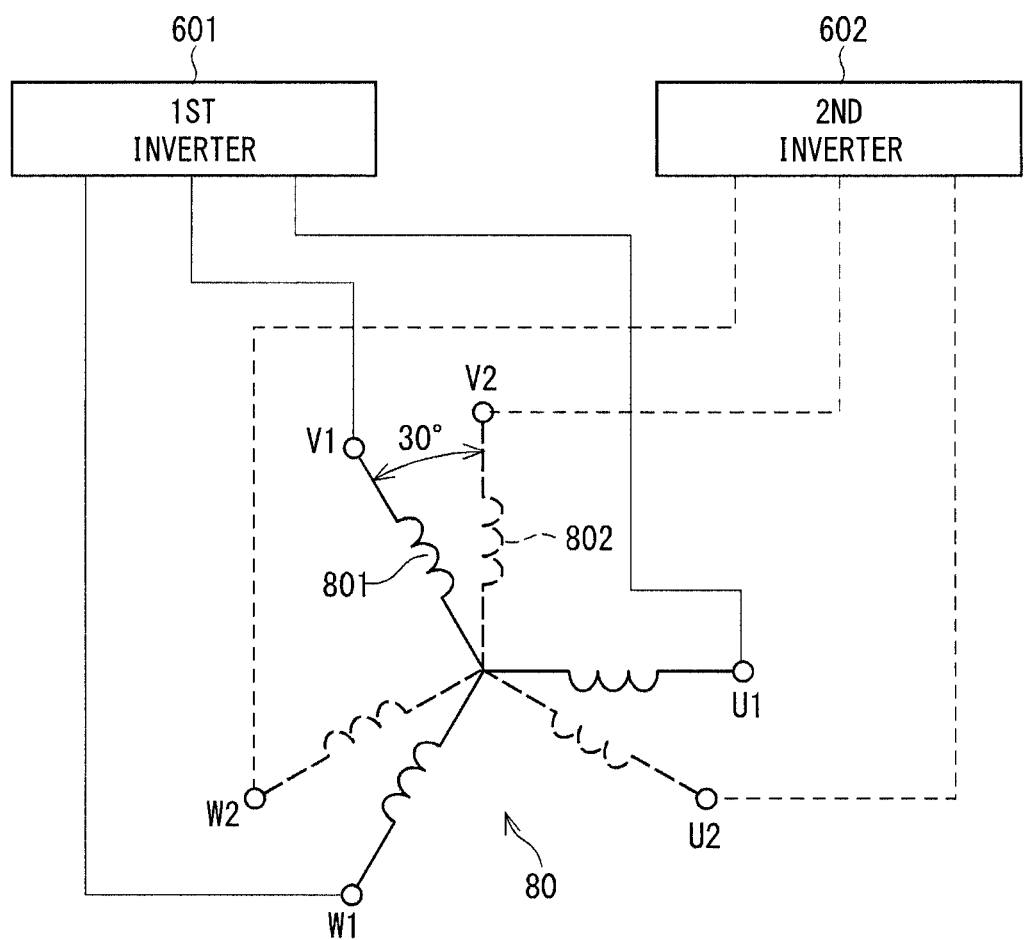
FIG. 5 is a schematic diagram of a configuration of a two-system multiphase coaxial motor.
Figure 6:
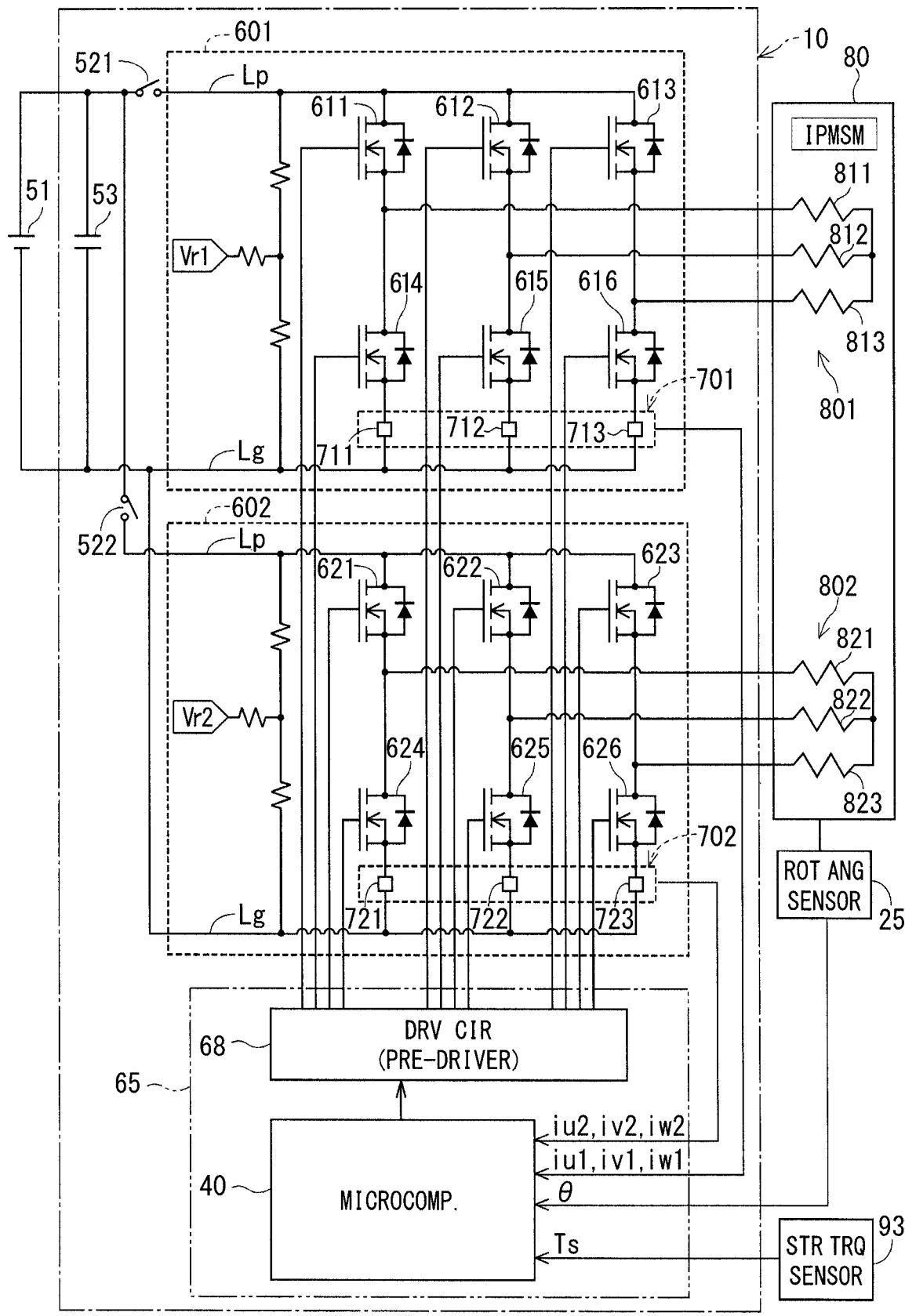
FIG. 6 is a schematic diagram of a configuration of the controller of the multiphase motor.

As shown in FIG. 5 and FIG. 6, the motor 80 that is controlled by the ECU 10 is a three-phase brushless motor in which two sets of three-phase windings 801 and 802 are provided coaxially. The windings 801 and 802 have the same electrical characteristics, and have a 30 degree electric angle shift from each other on the same stator, for example, as shown in FIG. 5.

Configuration of a Controller

The configuration of the ECU 10 is described with reference to FIG. 6. The motor 80 as a "multiphase rotating electric machine" is a three-phase brushless motor, which has two sets of three-phase windings 801 and 802 which are magnetically combined with each other. Coils 811, 812, and 813 corresponding respectively to a U phase, a V phase and a W phase are provided as the first winding 801. Coils 821, 822, and 823 corresponding respectively to the U phase, the V phase and the W phase are provided as the second winding 802. The rotation angle sensor 25 detects an electrical angle θ of the motor 80, and outputs the angle θ to a control section 65.

The motor 80 may be an embedded magnet-type synchronous rotating machine such as an Interior Permanent Magnet Synchronous Motor (IPMSM). Generally, an embedded magnet type rotating machine generates its torque as a combination or sum total of the magnet torque and the reluctance torque. That is, the ECU 10 in each embodiment controls a drive of the motor 80 that generates a torque that is a combination of the magnet torque and the reluctance torque.

The ECU 10 serving as a controller includes, for example, the inverters 601 and 602 that serve as a "power converter," current sensors 701 and 702, and the control section 65. A unit or combination of components that includes one of the windings 801, 802 and its corresponding inverter 601, 602 may be referred to as a "system." The inverter 601 of the first system corresponds to the first set of windings 801 and the inverter 602 of the second system corresponds to the second set of windings 802. Both of the inverters 601 and 602 may respectively output an alternating current having the same amplitude to the windings 801 and 802, with a phase difference among two output currents. The phase difference may be calculated as (30±60×n) degree, where n is an integer.

As for the inverters 601 and 602, the inverter 601 has six switching elements 611-616, and the inverter 602 has six switching 621-626. The switching elements 611-616, 621-626 may be MOSFETs and configured as a bridge connection between a high potential line Lp and a low potential line Lg of the inverters 601 and 602. The inverters 601 and 602 respectively perform a switching operation based on a driving signal from a drive circuit 68 of the control section 65, to convert a direct current power supply from a battery 51 and supply the converted power supply to the two sets of windings 801 and 802. A DC voltage input to the inverters 601 and 602 may first pass through a smoothing capacitor 53 and power supply relays 521 and 522. A voltage divider for each of the inverters 601 and 602 may be used to detect an input voltage to each system, as shown in FIG. 6 as Vr1 and Vr2.

The current sensor 701 detects phase currents iu1, iv1, and iw1 using current detection elements 711, 712, and 713 for the first system. The current sensor 702 detects the phase currents iu2, iv2, and iw2 using current detection elements 721, 722, and 723. The current sensors 701 and 702 feed the detected phase currents back to the control section 65.

The control section 65 includes the microcomputer 40 and the drive circuit 68, such as a pre-driver circuit. Any of the control section 65, microcomputer 40, and the drive circuit 68 may include a CPU, ROM, I/O, and communication interface (not shown), together with a bus line (not shown) for connecting the components of the control section 65 to each other and to other components outside the control section 65. The control section 65 may perform control functions by implementing a software process or instruction set. That is, the control section 65 may execute a program stored in a substantive, non-transitory computer readable medium such as a ROM or other storage device with a CPU. Alternatively, the processes and functions associated with the control section 65, described in greater detail below, may be implemented using hardware, for example, by using a specific circuit or hardware combination to perform the processes. Example hardware for executing such processes and functions may include: analog and digital circuit components, logic gates, active and passive circuit components, chips and integrated circuits (ICs), application specific integrated circuits (ASICs), and field-programmable gate arrays (FPGAs).

The control section 65 calculates a torque instruction based on the steering torque Ts detected by the steering torque sensor 93, and controls power supply to the motor 80 based on the torque instruction described above, the phase currents iu1, iv1, iw1, iu2, iv2, iw2, are used as feedback information to calculate and provide the electric angle θ and other information.

In the following description, a mode driving the motor 80 by supplying power to 2 sets of windings 801 and 802 from two inverters 601 and 602 is designated as a "two-system driving mode," and a mode driving the motor 80 by supplying power to 1 set of windings, that is, supplying power from one of the corresponding inverters 601 and 602 is designated as a "one-system driving mode."

The control section 65 of the present embodiment is switchable between the "two-system driving mode" and the "one-system driving mode." Typically, the control section 65 drives the motor 80 in the two-system driving mode, and when failure, malfunction, or abnormality is detected in one of the two systems, the drive of the motor 80 is continued by switching from the two-system driving mode to the one-system driving mode to use a non-failing, normal operating system.

However, switching from the two-system driving mode to the one-system driving mode may be made in other situations. For example, switching between the two modes may be performed based on vehicle operation, such as a particular driving situation.

A solution to issues provided by the present embodiment is described. A winding torque Tm1 from the first system winding and a winding torque Tm2 from the second system winding in a two-system motor that generates a torque that is a combination of the magnet torque and the reluctance torque are represented by equations (1.1) and (1.2).

In those equations, Kt is a torque constant, Ld and Lq are d-axis and q-axis self-inductances, Md and Mq are d-axis and q-axis mutual inductances, id1 and iq1 are the first-system's d-axis and q-axis currents, and id2 and iq2 are the second-system's d-axis and q-axis currents. In the present embodiment, harmonic currents are not taken into consideration, and as such, each of the d-axis and/or q-axis currents are zero-order, fundamental wave components. "Dq-axis" may be used herein as shorthand to refer to the "d-axis and/or q-axis."

[Equation 1.1]

$$Tm1 = Kt \times Iq1 + (Ld-Lq) \times (Id1 \times Iq1) + Md \times (Id2 \times Iq1) - Mq \times (Id1 \times Iq2) \quad \text{(Eq. 1.1)}$$

[Equation 1.2]

$$Tm2 = Kt \times Iq1 + (Ld-Lq) \times (Id2 \times Iq2) + Md \times (Id1 \times Iq2) - Mq \times (Id2 \times Iq1) \quad \text{(Eq. 1.2)}$$

When the equations (1.1) and (1.2) are combined, a total winding torque Tm is represented by an equation (2).

[Equation 2]

$$\begin{aligned} Tm = Tm1 + Tm2 = &\ Kt \times (Iq1 + Iq2) + (Ld - Lq) \times (Id1 \times Iq1 + Id2 \times Iq2) + \\ & (Md - Mq) \times (Id1 \times Iq2 + Id2 \times Iq1) \end{aligned} \quad \text{(Eq. 2)}$$

In the equation (2), when "id1=id2" and "iq1=iq2", the total winding torque Tm from the two systems is represented by an equation (3) using id1 and iq1.

[Equation 3]

$$\begin{aligned} Tm = Tm1 + Tm2 = &\ 2Kt \times Iq1 + \\ & 2(Ld - Lq) \times (Id1 \times Iq1) + 2(Md - Mq) \times (Id1 \times Iq1) \end{aligned} \quad \text{(Eq. 3)}$$

A d-axis magnetic flux Φd1 of the first system and a q-axis magnetic flux Φq1 are represented by equations (4.1) and (4.2) based on the equation (1).

[Equation 4.1, 4.2]

$$\phi d1 = Kt + (Ld \times Id1) + (Md \times Id2) \quad \text{(Eq. 4.1)}$$

$$\phi q1 = (Lq \times Iq1) + (Mq \times Iq2) \quad \text{(Eq. 4.2)}$$

Figure 7A:
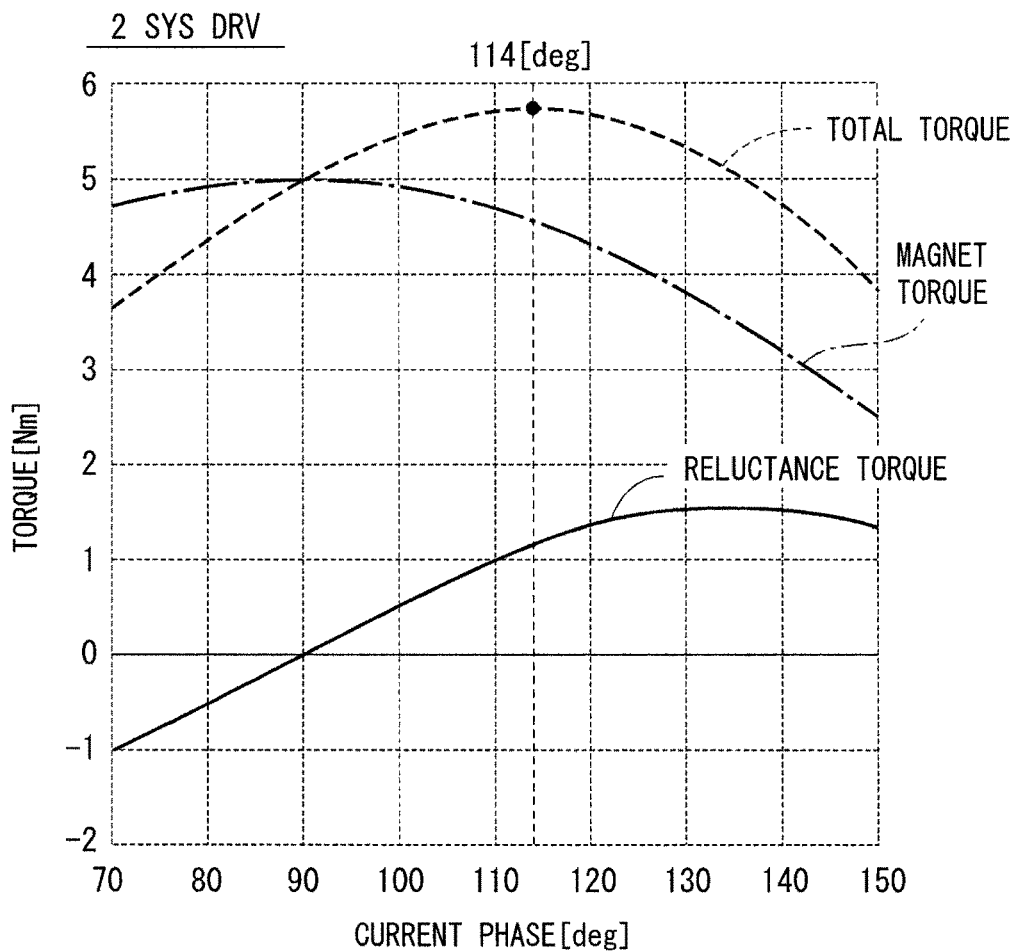
FIG. 7A is a characteristic diagram of a relationship between a current phase and a torque in a two-system driving mode.
Figure 7B:
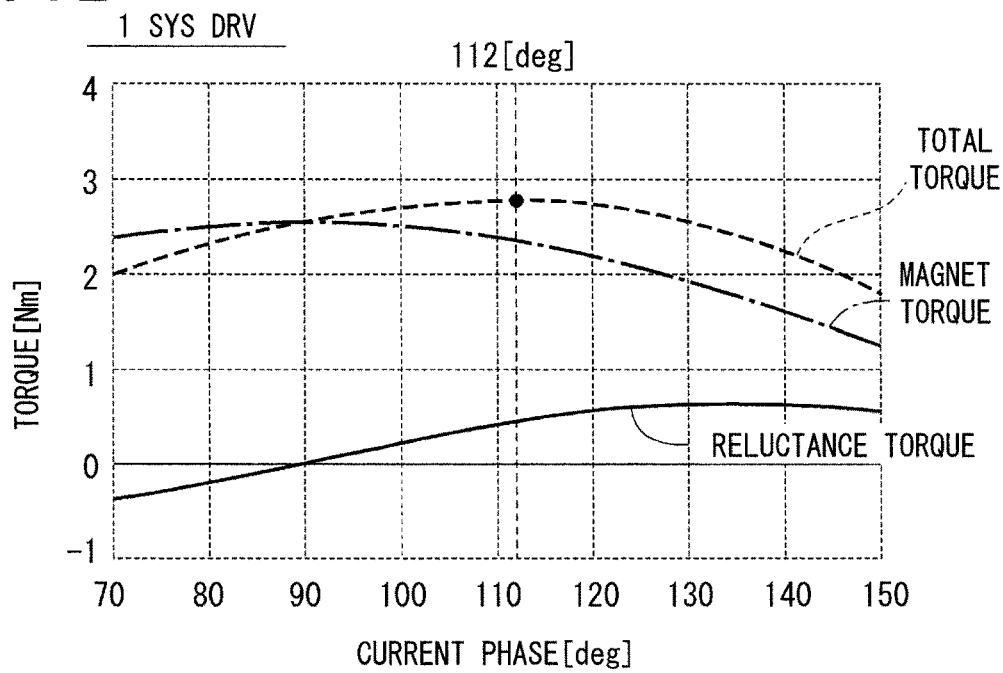
FIG. 7B is a characteristic diagram of a relationship between a current phase and a torque in a one-system driving mode.
Figure 8:
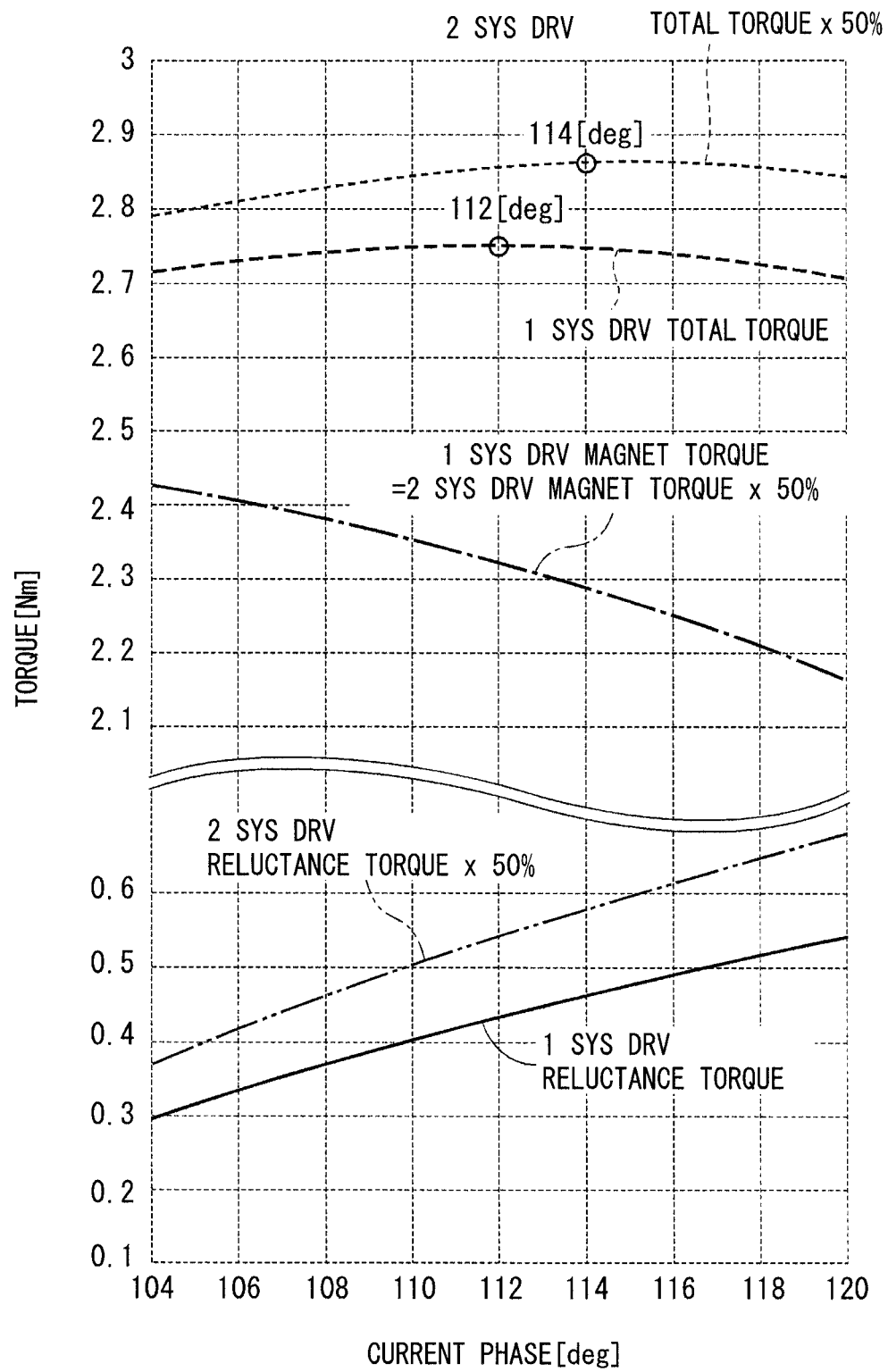
FIG. 8 is an expanded view of the diagram in FIG. 7B.

With reference to FIGS. 7A, 7B, and FIG. 8, a relationship between a dq-axis current phase and the magnet torque/reluctance torque is described. The dq-axis current phase is a phase of an electric current, which uses the d-axis as a reference. That is, a +d-axis may be 0 degrees (0°), where an angle increases counterclockwise, so that the +q-axis may be 90 degrees (90°), the −d-axis may be 180 degrees (180°), and so forth.

The numbers in FIGS, 7A, 7B, and FIG. 8 are calculated by the equations (2) or (3) under certain conditions, in which arbitrary values are set to a maximum current amplitude [A], a torque constant Kt [Nm/A], (Ld−Lq) [H], and (Md−Mq) [H], respectively.

The maximum current amplitude is a square root of a sum of squares of a d-axis current id and a q-axis current iq. In other words, a torque in each current phase is calculated based on the values of the d-axis current id and the q-axis current iq that are set up to yield a constant value for the square root of the sum of squares. Each of the following maps is also obtained by the calculation based on similar conditions. Therefore, numbers, e.g., the torque value, the current value and other values in the characteristics diagrams or maps, are shown as examples only, to illustrate change trends. Some of those numbers are shown as percentage values [%] for a relative comparison.

The change of each of the total torque, the magnetic torque, and the reluctance torque relative to the current phase in the two-system driving mode is shown in FIG. 7A. As a practical diagram, the torque diagram is required to show only a range exceeding 90° [deg] at which the d-axis current falls below zero, a range including 70° [deg] is shown in FIG. 7A, for illustration purposes of showing a change trend. The magnet torque is drawn as a parabolic shape with a peak at 90° [deg]. The reluctance torque increases almost linearly in a range from 70° [deg] to about 120° [deg]. Further, a phase at which the total torque combining the magnet torque and the reluctance torque maximizes is about 114° [deg].

With reference to FIG. 7B, a change of each of the total/magnetic/reluctance torques relative to the current phase in the one-system driving mode is shown. In the one-system driving mode, the maximum current amplitude is assumed as 50% of the maximum current amplitude in the two-system driving mode. The magnet torque in the one-system driving mode is 50% of the magnet torque in the two-system driving mode.

On the other hand, the reluctance torque in the one-system driving mode is smaller than 50% of the reluctance torque in the two-system driving mode, since the term for the mutual inductance (Md-Mq) is equal to 0. As a result, the phase where the total torque is maximum is about 112° [deg], which is different than the 114° [deg] peak phase (e.g., maximum value) in the two-system driving mode. In other words, the phase of the total torque maximum shifts from 114° in the two-system driving mode to about 112° in the one-system driving mode.

FIG. 8, which is an enlarged diagram around a peak phase, shows the reluctance torque compared to a 50% value of the total torque in the two-system driving mode. The reluctance torque in the one-system driving mode is shown as a smaller value than 50% of the reluctance torque in two-system driving mode. Further, the current phase at which the total torque maximizes in the one-system driving mode (e.g., about 112° [deg]) is shifted from the current phase at which the total torque maximizes in the two-system driving mode (e.g., about 114° [deg]).

Thus, the "optimal" current phase at which the maximum torque is output is different in the two-system driving mode and the one-system driving mode. Even when the same per-system current as the two-system driving mode is supplied in the one-system driving mode, the output torque in the one-system driving mode does not reach 50% of the output torque of the two-system driving mode. Therefore, when one of the systems in the two-system driving modes fails/malfunctions and the steering system 100 shifts from the two-system driving mode to the one-system driving mode, the substantive output of the one system decreases if the per-system power supply amount is maintained, that is, is kept unchanged.

Thus, when shifting from the two-system driving mode to the one-system driving mode, the control section 65 is configured to change the amount of power supplied to the one system so that the output in the one-system driving mode is maintained as 50% of the output in the two-system driving mode, that is, so that the output of the one system in the one-system driving mode is the same as the output of one of the system in the two-system driving mode.

More practically, the control section in each of the embodiments, when operating in the one-system driving mode, changes at least one of the maximum amplitude of the per-system electric current and the dq-axis current phase (e.g., a phase of the alternating current), to compensate for the reluctance torque generated by the mutual inductance of the two sets of windings 801, 802 in the two-system driving mode.

The configuration of the control section 65 is described in each of the following embodiments. For ease of understanding the first, second, third, and fourth embodiments, a corresponding integer 1, 2, 3, and 4 may be added to the end of the reference character of the above-described features and elements. For example, the control section in the first embodiment may use the reference character 651, the control section in the second embodiment may use the reference character 652, and so on. Like features and elements throughout the embodiments may use the same reference characters and a repeat description of the like features, elements, and configurations may be omitted for brevity.

First Embodiment

Figure 9:
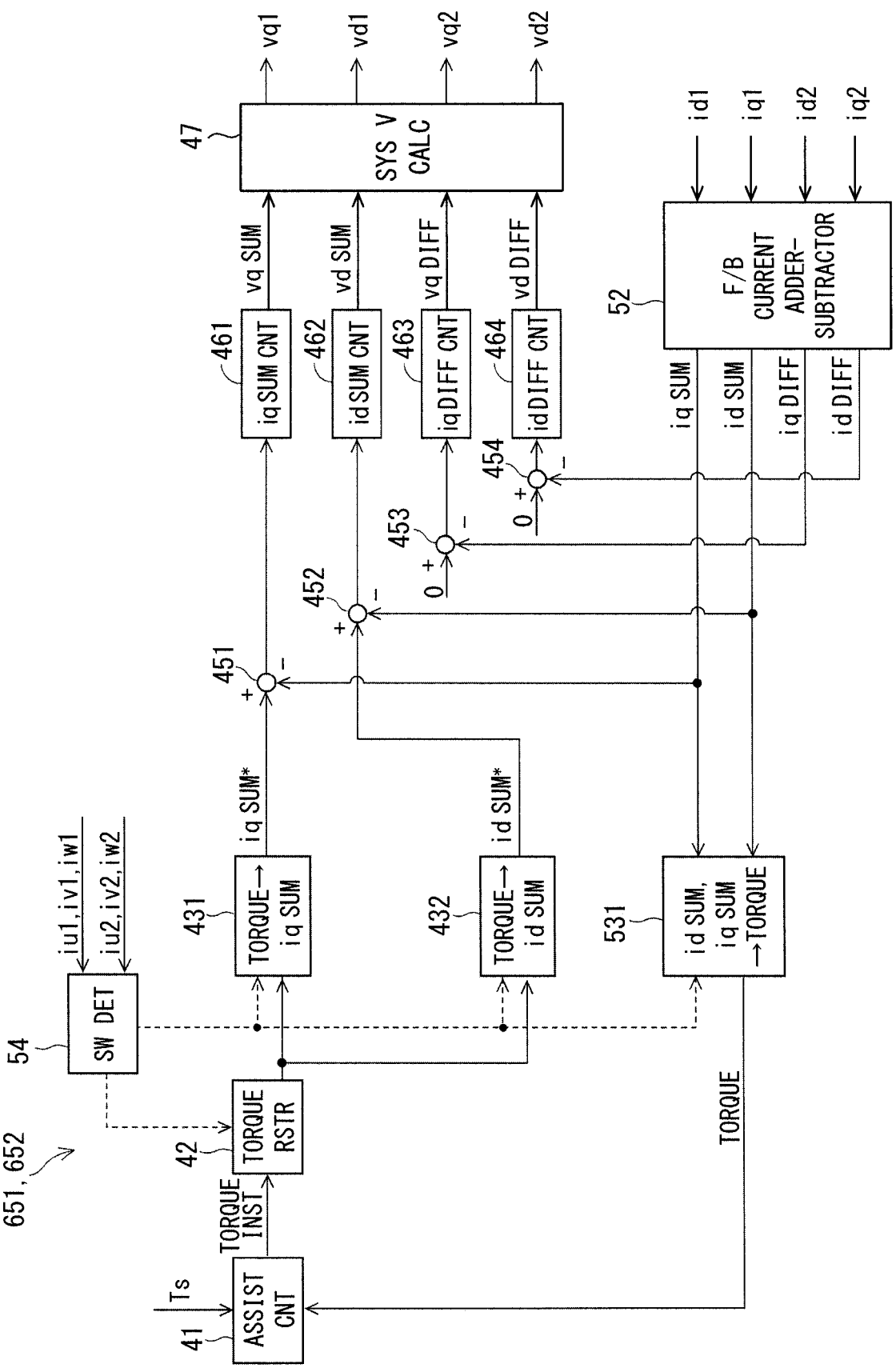
FIG. 9 is a block diagram of a control section in a first and second embodiment of the present disclosure.

With reference to FIGS. 9-12B, the first embodiment of the present disclosure is described. The configuration of a control section 651 in the first embodiment is shown in FIG. 9. Since the configuration of the control section 651 and the configuration of a control section 652 in the second embodiment are the same, numerals "651, 652" appear side by side in FIG. 9.

The control section 651 in the first embodiment performs a feedback control, to feed back a sum and a difference of the dq-axis actual currents that flow into the two sets of windings 801 and 802 to a sum and a difference of a d-axis current instruction and a q-axis current instruction in the two systems. This method makes a calculation of the dq current instruction easier compared with a feedback configuration that provides feedback to the current instruction in each system. Note that, in this case, the amplitude of the current supplied to two systems has the same size, and the phase is shifted by 30° (degrees) from each other among the three-phase currents.

The control section 651 may include an assist controller 41, a torque limiter 42, torque-current calculators 431 and 432, current deviation calculators 451-454, control units 461-464, a system voltage calculator 47, a feedback ("F/B") current adder-subtractor 52, a dq-axis current sum-torque calculator 531, and a switching determiner 54.

In FIG. 9, regarding the output calculation of the control section 651, elements involving a q-axis current are positioned "above" elements involving a d-axis current. On the other hand, regarding the feedback current which is drawn at the lower right corner in the drawing, elements involving a d-axis current are positioned "above" elements involving a q-axis current. When a q-axis current and a d-axis current are drawn collectively, it may be described as "dq-axis currents," regardless of how it appears in the drawing. The arrows shown in the drawings may indicate an order or direction flow of values, for example, the "torque→iq sum calculator 431" corresponds to an arrow in the drawing, starting from a "torque" toward an "iq sum." A "calculator" does not appear in the drawing.

In FIG. 9, the following components are dropped from illustration. That is, (i) a two phase three phase converter for converting the dq-axis voltage instructions vq1, vd1, vq2, vd2, and (ii) a gate signal generator for generating a pulse width modulation signal or the like based on a three-phase voltage instruction and for outputting the signal to the inverters 601 and 602 are not shown in the drawing. A three phase two phase converter for converting a three-phase current fed back from the current sensors 701 and 702 to the dq-axis currents id1, iq1, id2, iq2 is also not shown in the drawing. These components may be implemented, for example, by as a vector control and a PWM control. For coordinate conversion between the first system and the second system, θ is used as an electric angle in the first system, while (θ−30°), i.e., a 30° [deg] shifted phase is used as an electric angle in the second system.

The assist controller 41 may calculate a torque instruction based on the steering torque Ts input from the steering torque sensor 93 and the torque of the motor 80 that the dq-axis current sum-torque calculator 531 calculates from an actual current. In the following paragraphs, if "torque" is not specifically designated, for example, "the steering torque Ts," a "torque" may simply refer to the assist torque output by the motor 80. And where the meaning of "torque" is clear and causes no confusion, "torque instruction" may be simply designated as a "torque," without explicitly using "instruction."

Figure 10:
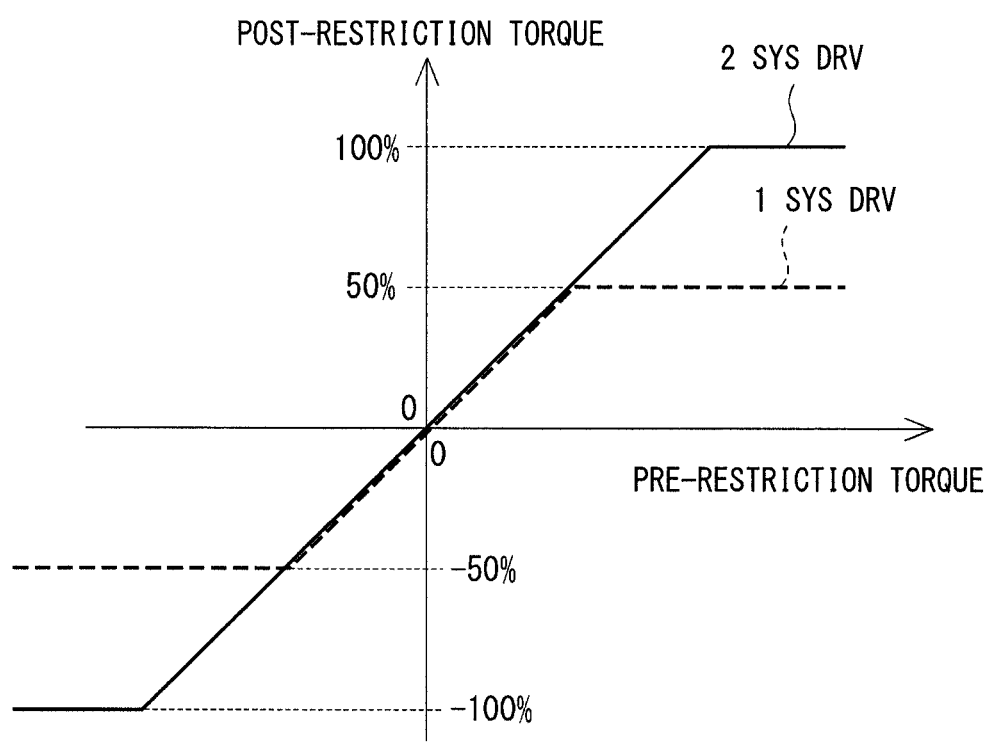
FIG. 10 is a torque restriction map used in the first embodiment of the present disclosure.

The torque limiter 42 restricts an upper limit value of a torque instruction using a torque restriction map shown in FIG. 10. In the map of FIG. 10, when a torque restriction value in the two-system driving mode is set as 100%, a torque in the one-system driving mode is restricted to 50%. Here, a current restriction value, i.e., a restriction value of a current amplitude, substantially correlates with a torque restriction value. However, a ratio of the current restriction value of the one-system driving mode to the current restriction value of the two-system driving mode, and a ratio of a torque restriction values may not completely correlate due to the influence of the above-described reluctance torque. That is, a torque output in the one-system driving mode falls below 50% of the torque output in the two-system driving mode, even when the current amplitude is set to 50% of the two-system driving mode. Taking such fact into consideration, a current restriction map corresponding to a torque restriction map is obtained.

The torque→iq sum calculator 431 and the torque→id sum calculator 432 respectively compute an iq sum* that is a sum of q-axis current instructions, and an id sum* that is a sum of d-axis current instructions. Both the torque→iq sum calculator 431 and the torque→id sum calculator 432 make computations with reference to the map based on a post-restriction torque.

Further, an iq difference*, which is a difference of two q-axis current instructions, and an id difference*, which is a difference of two d-axis current instructions, are both equal to "0," since the two q-axis current instructions and the two d-axis current instructions in the two systems are set up as the same value.

Figure 11A:
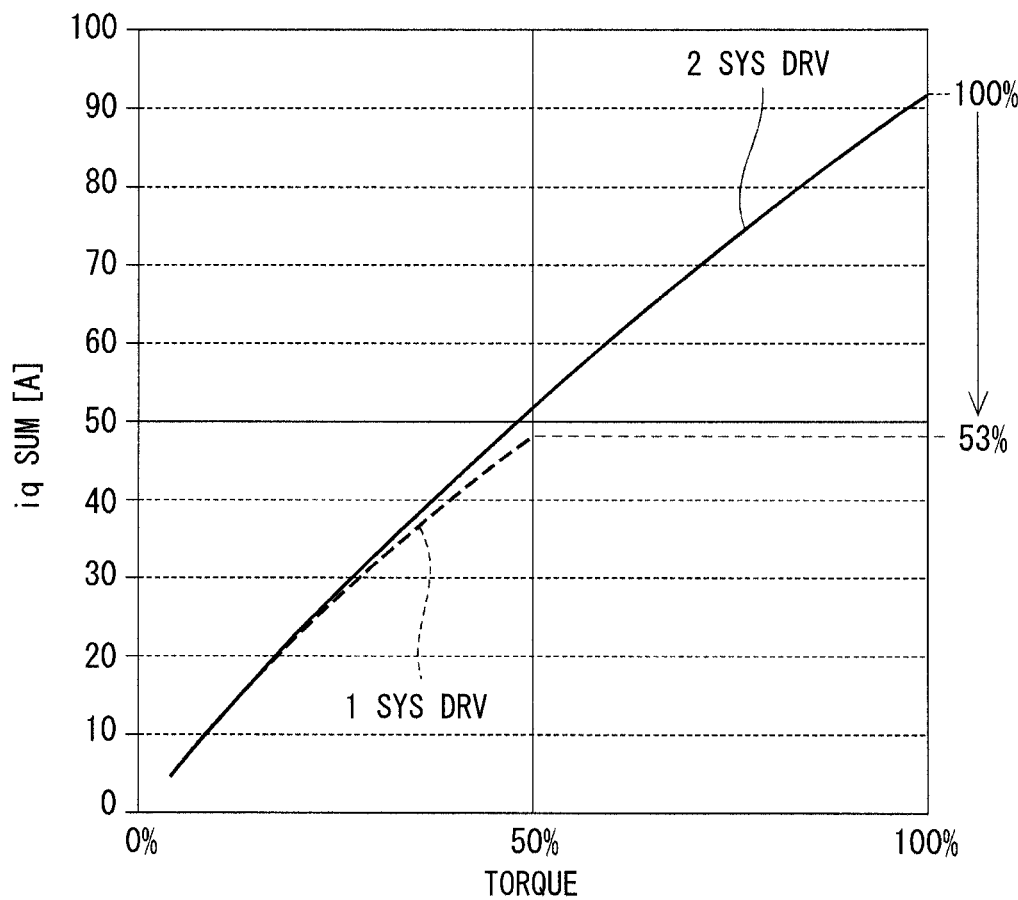
FIG. 11A is a torque-iq sum map used in the first embodiment of the present disclosure.
Figure 11B:
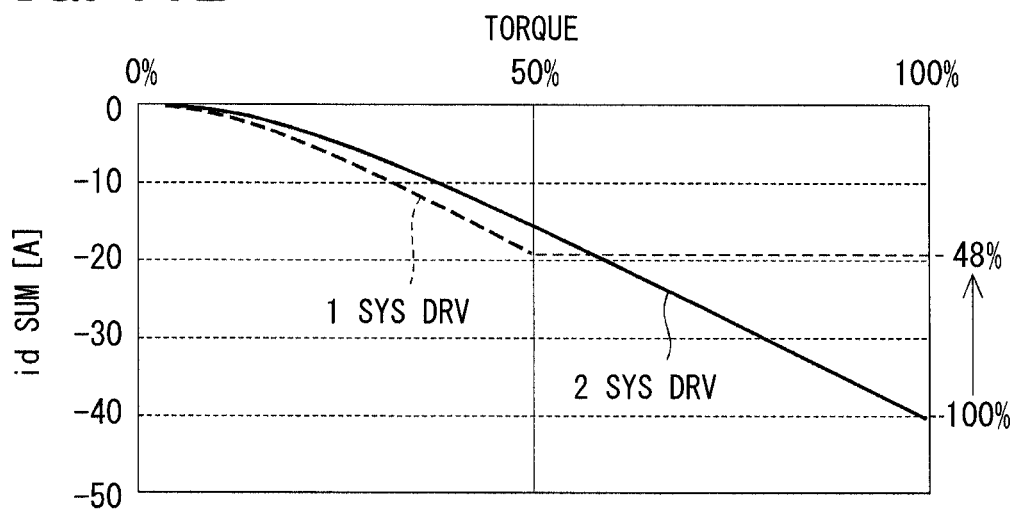
FIG. 11B is a torque-id sum map used in the first embodiment of the present disclosure.

The torque→iq sum calculator 431 and the torque→id sum calculator 432 use a torque-iq sum map and a torque-id sum map, which are shown in FIG. 11A and 11B. In the illustrations and description of those maps, the superscript asterisk notation "*" in an "iq sum*" and an "id sum*" is dropped, to simplify them as "iq sum" and "id sum." In the one-system driving mode, it is assumed that only one system receives power supply, and an electric current of the power supply is designated as "iq1" for the q-axis current and as "id1" for the d-axis current. The "q-axis current iq" and the "d-axis current id" may be shortened to "iq" and "id" in the following description.

As shown by a solid line, in the two-system driving mode, the iq sum, which takes a positive value within a torque range from 0% to 100%, increases in a positive direction (of the iq sum axis), and an absolute value of the id sum, which takes a negative value within a torque range from 0% to 100%, increases in a negative direction (of the id sum axis).

As shown by a dashed line, in the one-system driving mode, iq1 which takes a positive value within a torque range from 0% to 50% increases in a positive direction, and an absolute value of id1, which takes a negative value, increases in a negative direction.

An inclination of a rise curve (e.g., slope) of iq1 in the torque range from 0% to 50% is slightly smaller than an inclination of the rise curve of the iq sum, and an inclination of the rise curve of the absolute value of id1 is slightly greater than an inclination of the rise curve of the absolute value of id sum.

The iq sum and the id sum corresponding to 100% torque in the two-system driving mode are respectively assumed as 100%. In the map of FIG. 11A, the q-axis current iq1 corresponding to 50% torque in the one-system driving mode is equivalent to 53% of the iq sum corresponding to 100% torque in the two-system driving mode. The d-axis current id1 corresponding to 50% torque in the one-system driving mode is equivalent to 48% of the id sum corresponding to 100% torque in the two-system driving mode.

A ratio of "the maximum current amplitude corresponding to 50% torque in the one-system driving mode" to "the maximum current amplitude corresponding to 100% torque in the two-system driving mode" is 52%. That is, the maximum amplitude of electric current that is supplied in the one-system driving mode is set to be greater than the maximum amplitude of per-system electric current that is supplied to one of the two systems in the two-system driving mode, i.e., is greater than 50% of the maximum current amplitude in the two-system driving mode.

Further, according to the maps of FIG. 11A and 11B, "the ratio of the iq sum and the id sum" for a certain torque in the two-system driving mode is different from "the ratio of iq1 and id1" in the one-system driving mode for the same torque. That is, "the current phase at which an output of the maximum torque is enabled with the minimum current" which corresponds to an arc tangent of the ratio of map-calculated iq and id is different in the two-system driving mode and in the one-system driving mode. Thus, the control section 651 in the first embodiment sets different phases as an optimal current phase in the two-system driving mode and an optimal current phase in the one-system driving mode for the same torque instruction.

The feedback current adder-subtractor 52 adds and subtracts the dq-axis currents id1, iq1, id2, and iq2 that are input from the non-illustrated three phase two phase converter, for calculating the iq sum, the id sum, an iq difference, and an id difference. The dq-axis current sum-torque calculator 531 calculates a torque based on the iq sum and the id sum by referencing the map. The dq-axis current sum-torque calculator 531 uses two input maps for the iq sum and the id sum, e.g., an iq sum-torque map shown in FIG. 12A and an id sum-torque map shown in FIG. 12B.

Figure 12A:
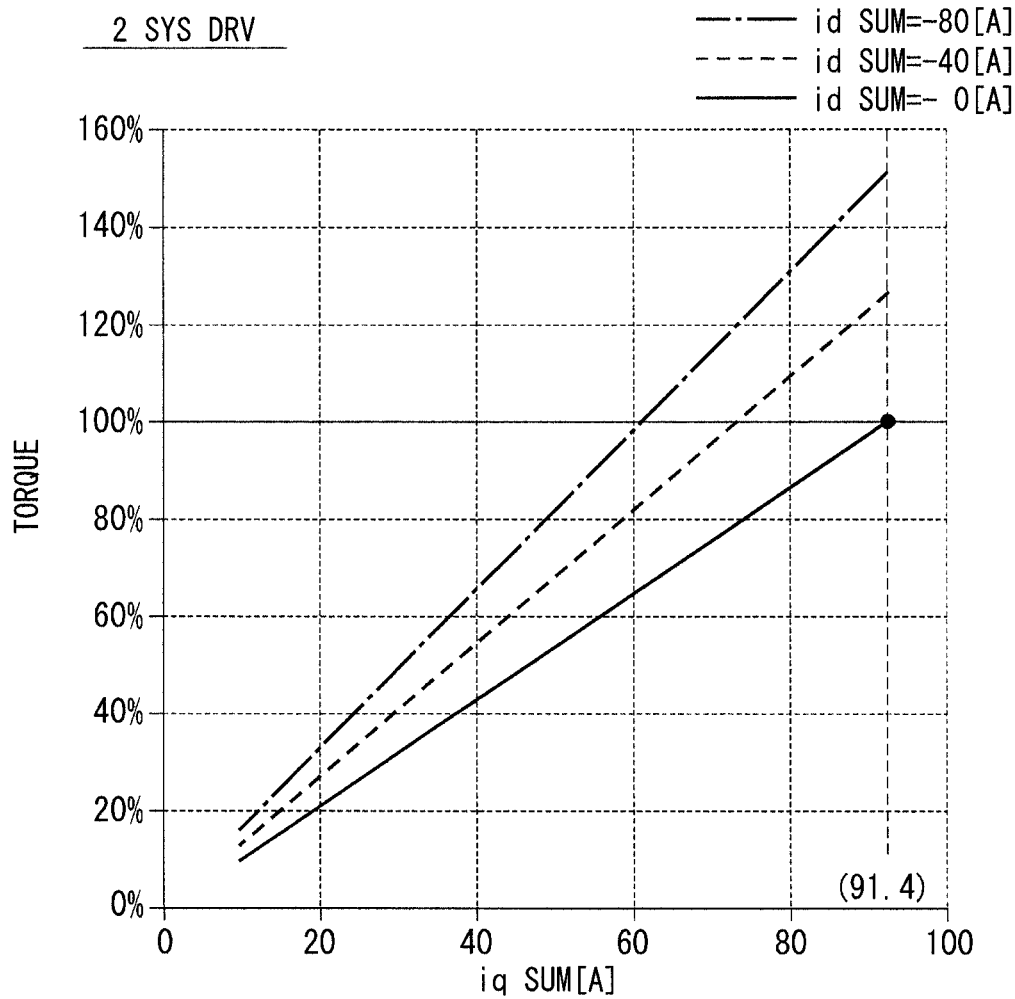
FIG. 12A is a torque-iq sum map of the two-system driving mode used in the first embodiment of the present disclosure.

In FIG. 12A, a relationship between the iq sum and the torque for the id sum=0, −40, or −80 [A] in the two-system driving mode is shown. In this example, the maximum iq sum is about 91.4 amps [A]. Here, a torque corresponding to the maximum iq sum for the id sum=0 [A] is set as 100% torque. As the id sum decreases from 0 to −40 and −80 [A] (i.e., as an absolute value of the id sum increases), a torque value corresponding to the same iq sum increases.

For example, for calculating a torque for the id sum=−60 [A], a linear interpolation of calculation results of the id sum =−40 [A] and the id sum =−80 [A] is performed.

Figure 12B:
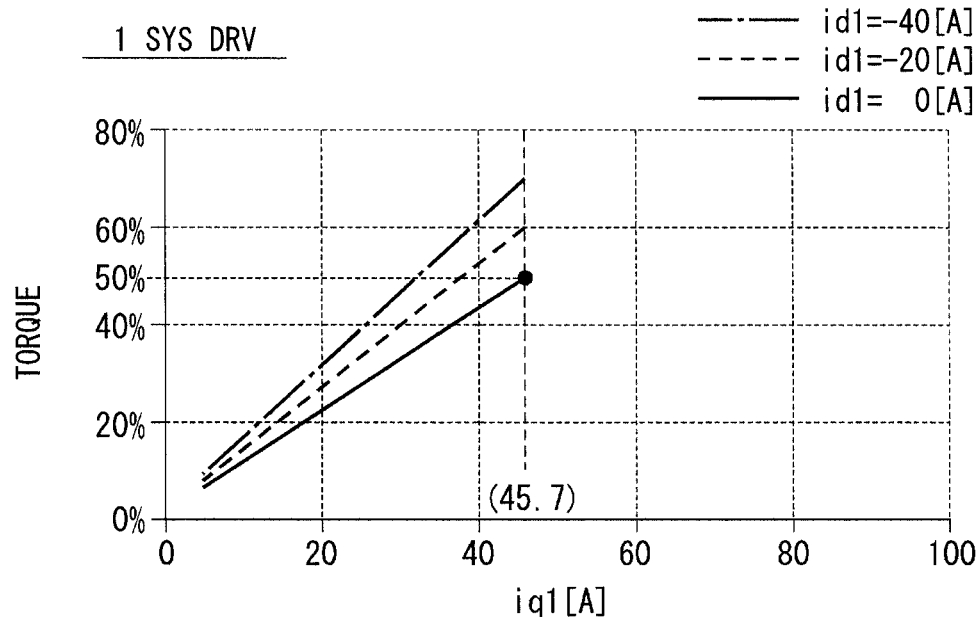
FIG. 12B is a torque-iq sum map of the one-system driving mode used in the first embodiment of the present disclosure.

In FIG. 12B, a relationship between the iq1 and the torque for the id1=0, −20, or −40 [A] in the one-system driving mode is shown. In this example, the maximum iq1 is equivalent to 50% of the iq sum in the two-system driving mode, i.e., about 45.7 [A]. Here, a torque corresponding to the maximum iq sum for id1=0 [A] is set as 50% torque. As the id1 decreases from 0 to −20 and −40 [A] (i.e., as an absolute value of the id1 increases), a torque value corresponding to the same iq1 increases.

For example, for calculating a torque for id1=−30 [A], a linear interpolation of calculation results of id1=−20 [A] and id1=−40 [A] is performed.

The iq sum deviation calculator 451 calculates a deviation of the iq sum* and an iq sum feedback value. The id sum deviation calculator 452 calculates a deviation of the id sum* and an id sum feedback value. The iq difference deviation calculator 453 calculates a deviation of "0" corresponding to an iq difference* and an iq difference feedback value. The id difference deviation calculator 454 calculates a deviation of "0" corresponding to an id difference* and an id difference feedback value.

The iq sum control unit 461 calculates a vq sum that is a sum of q-axis voltage instructions by a proportional integration (PI) operation for bringing a deviation of the iq sum* and the iq sum closer to 0. The id sum control unit 462 calculates a vd sum that is a sum of d-axis voltage instructions by the PI operation for bringing a deviation of the id sum* and the id sum closer to 0. The iq difference control unit 463 calculates a vq difference which is a difference of q-axis voltage instructions by the PI operation for bringing a deviation of 0 and the iq difference closer to 0. The id difference control unit 464 calculates a vd difference which is a difference of d-axis voltage instructions by the PI operation for bring a deviation of 0 and the id difference closer to 0.

The system voltage calculator 47 converts the vq sum, the vd sum, the vq difference, and the vd difference into voltage instruction values vq1, vd1, vq2, and vd2, and outputs those values to a three phase two phase converter.

Further, the PWM signal generated based on the three-phase voltage instruction is output to the inverters 601 and 602, and the alternating voltage converted by the switching operation of the inverters 601 and 602 is applied to the windings 801 and 802.

The switching determiner 54 determines switching between the two-system driving mode and the one-system driving mode. For example, during the operation in the two-system driving mode, the switching determiner 54 obtains information, for each system, regarding the three-phase currents iu1, iv1, iw1, iu2, iv2, iw2, together with information about the temperature of the inverters 601, 602 and the windings 801, 802.

When detecting any abnormalities, e.g., an overcurrent of one of the two systems or disconnection based on the information described above, the switching determiner 54 stops the drive of an abnormal system, and determines the switching from the two-system driving mode to the one-system driving mode. Then, as shown by a dashed line in FIG. 9, the switching determiner 54 notifies such a determination result to the torque limiter 42, the torque→iq sum calculator 431, the torque→id sum calculator 432, and the dq-axis current sum→torque calculator 531.

Note that, depending on the type of the system failure, the electric current flowing in the winding of the drive-stopped system may be not equal to 0. Therefore, even in the one-system driving mode, it may be meaningful to obtain information regarding the dq-axis current of the faulty/abnormal system as an input for the map. Further, the switching determiner 54 may determine to switch to the driving mode based on factors other than the failure/malfunction of one of the driving systems.

As described above, the control section 651 in the first embodiment switches the torque-iq sum map and the torque-id sum map which are used by the torque→iq sum calculator 431 and the torque→id sum calculator 432 based on the switching between the two-system driving mode and the one-system driving mode. Based on the switching between the two-system driving mode and the one-system driving mode, the control section 651 switches the iq sum and id sum-torque map which is used by the dq-axis current sum→torque calculator 531.

In such manner, even when the driving mode is switched from the two-system driving mode to the one-system driving mode, the per-system output in the two-system driving mode is appropriately maintained in the one-system driving mode, As such, the electric power steering device in a vehicle can maintain 50% of the normal-time assist force/torque when one of the systems fails or malfunctions.

Thus, the ECU 10 can efficiently output a torque in both of the two-system driving mode and the one-system driving mode, during a drive of the motor 80 where a total torque is generated as the combination of the magnet torque and the reluctance torque. More practically, by switching the torque-current maps, an amount of per-system power supply in the two-system driving mode and an amount of power supply in the one-system driving mode can be harmonized to more easily and appropriately switch from the two-system driving mode to the one-system driving mode.

Although, in the present embodiment, the maximum current amplitude in the one-system driving mode is set to be greater than 50% of the maximum current amplitude in the two-system driving mode for an output of one half torque in the one-system driving mode, the per-system maximum current amplitude may be set to the same value in both of the one-system driving mode and the two-system driving mode, and the maps shown in FIGS. 11A, 11B, 12A, and 12B may be set and modified accordingly. In such cases, by changing the phase of the alternating current in the one-system driving mode and in the two-system driving mode, the maximum torque can be output under the restriction of the maximum current amplitude.

Second Embodiment

Figure 13:
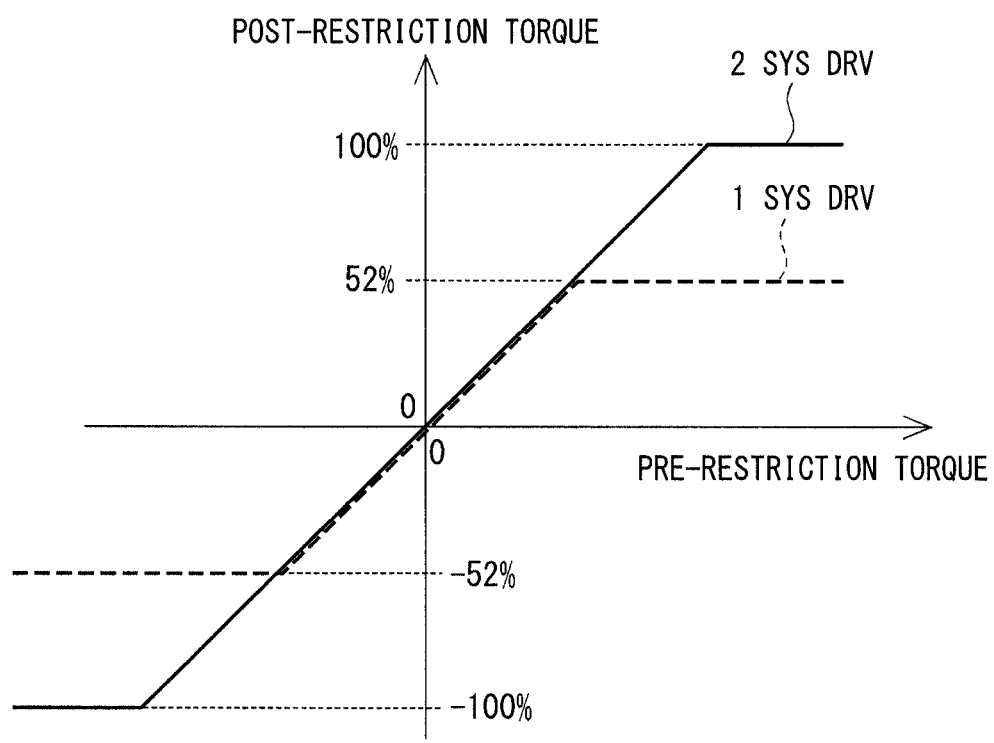
FIG. 13 is a torque restriction map used in the second embodiment of the present disclosure.
Figure 14A:
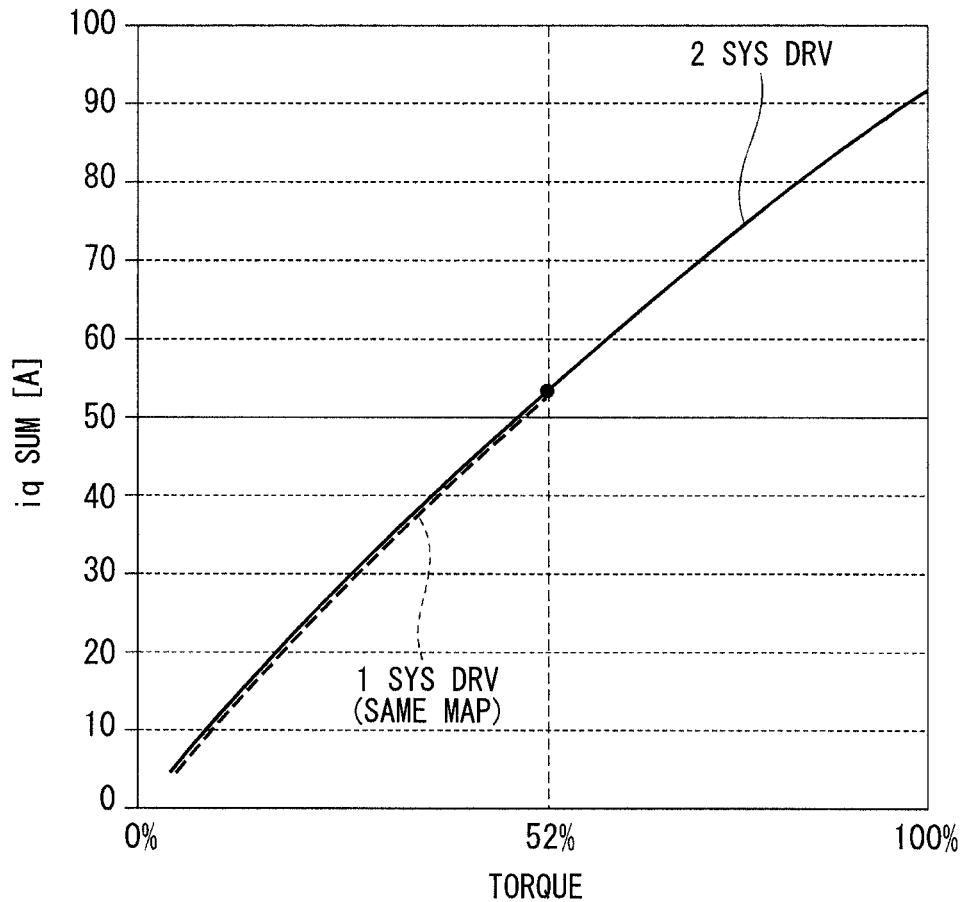
FIG. 14A is a torque-iq sum map used in the second embodiment of the present disclosure.
Figure 14B:
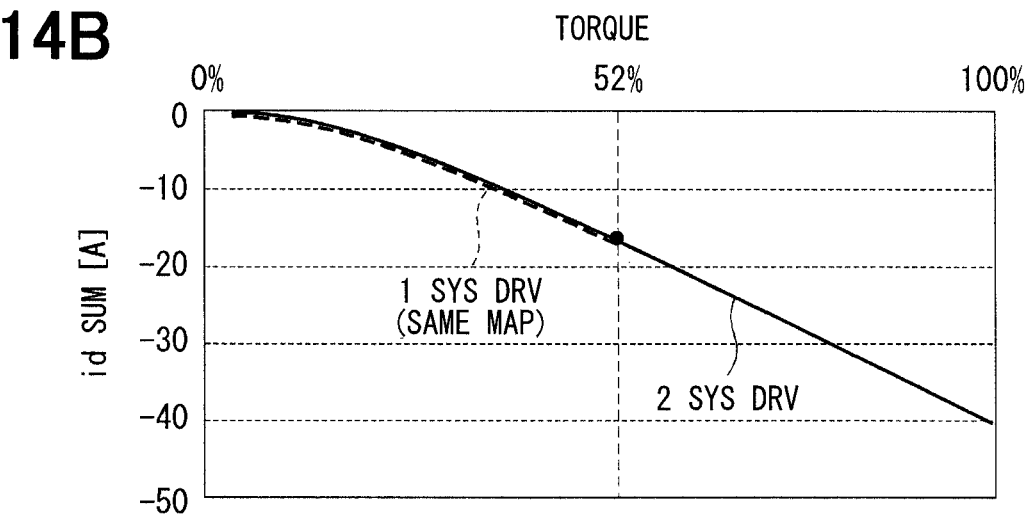
FIG. 14B is a torque-id sum map used in the second embodiment of the present disclosure.

With reference to FIGS. 13, 14A, and 14B, the second embodiment of the present disclosure is described. A control section 652 of the second embodiment has the same configuration as the control section 651 in the first embodiment shown in FIG. 9, but uses a different map in the one-system driving mode. That is, the torque limiter 42 uses a torque restriction map shown in FIG. 13. In this map, when a torque restriction value in the two-system driving mode is assumed as 100%, a torque in the one-system driving mode is restricted to 52%.

The torque→iq sum calculator 431 and the torque→id sum calculator 432 use the torque-iq sum map and the torque-id sum map shown in FIGS. 14A and 14B. The map in the two-system driving mode is the same as that of FIGS. 11A and 11B. In the one-system driving mode, the same map as the two-system driving mode is used in a range of up to 52% of the maximum torque.

In such manner, the amplitude of the maximum current that is supplied in the one-system driving mode is set to be greater than the amplitude of the per-system maximum current in the two-system driving mode, i.e., set to be greater than "50% of the maximum current amplitude in the two-system driving mode." Further, the dq-axis current phase that is correlated with the ratio of the q-axis current and the d-axis current becomes the same in both of the two-system driving mode and the one-system driving mode. The dq-axis current sum-torque calculator 531 uses, just like the first embodiment, the iq sum and id sum-torque map shown in FIGS. 12A and 12B.

That is, the control section 652 in the second embodiment sets the maximum amplitude of the current supplied in the one-system driving mode to be greater than the maximum amplitude of the current supplied per-system in the two-system driving mode. More practically, the control section 652 sets, in the one-system driving mode, (i) the torque restriction value corresponding to the torque instruction, or (ii) the corresponding current restriction value to be greater than 50% of the torque restriction value or the corresponding current restriction value in the two-system driving mode. Therefore, the same effects as the first embodiment are achievable.

Third Embodiment

Figure 16A:
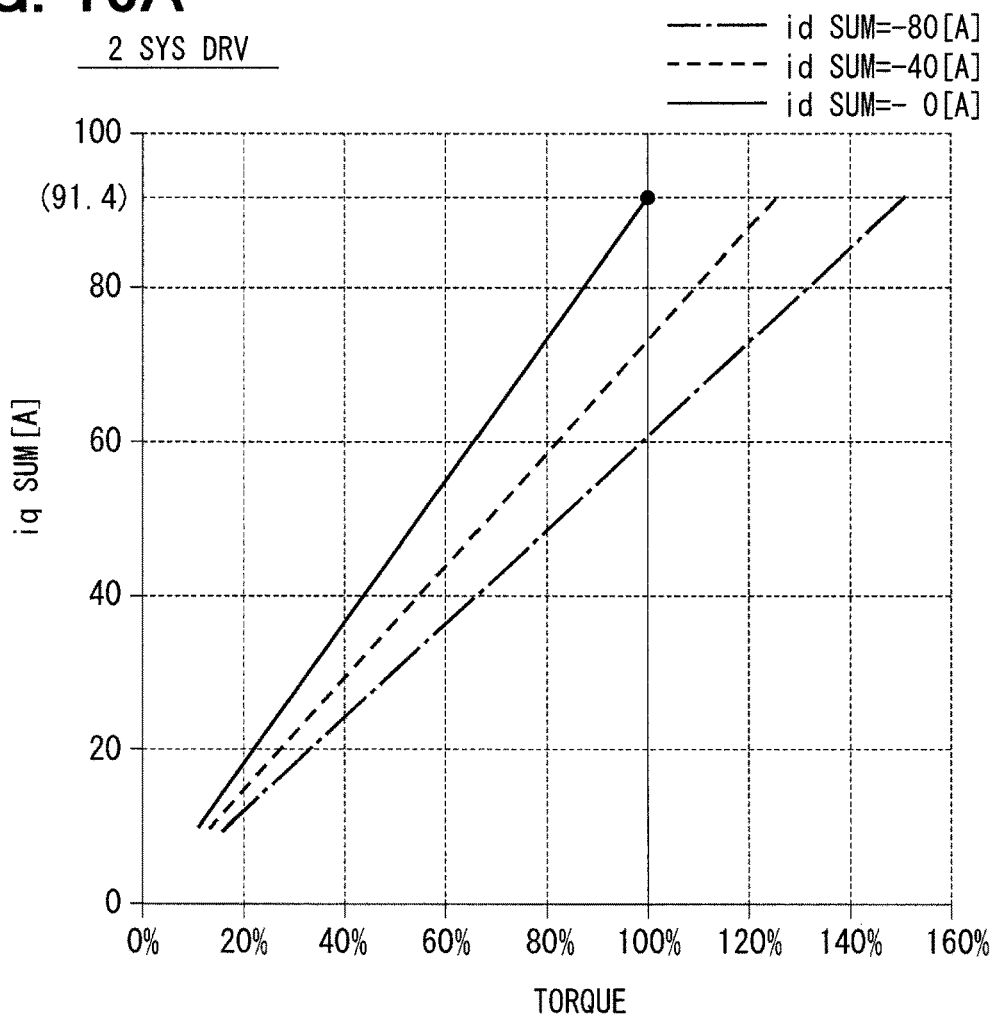
FIG. 16A is a torque-iq sum map of the two-system driving mode used in the third embodiment of the present disclosure.
Figure 16B:
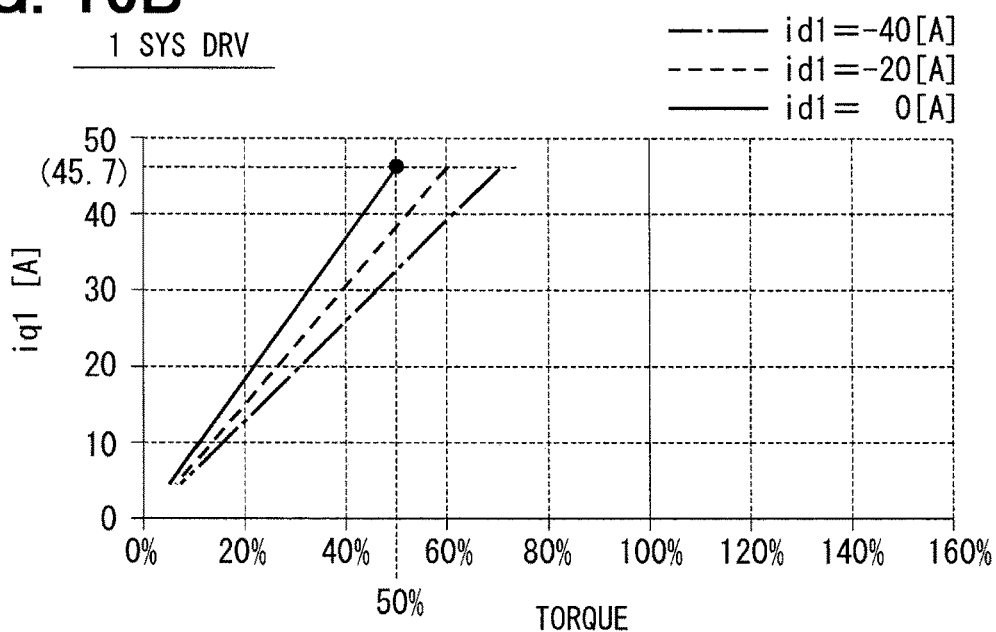
FIG. 16B is a torque-iq sum map of the one-system driving mode used in the third embodiment of the present disclosure.

With reference to FIGS. 15, 16A, and 16B, the third embodiment of the present disclosure is described. A control section 653 in the third embodiment is provided with a field-weakening controller 49 and a minimum value selector 442, shown as "FLD WKN CNT 49" "MIN SELECT 442" in FIG. 15 in addition to all the elements of the configuration of the control section 651 in the first embodiment shown in FIG. 9.

The field-weakening controller 49 calculates an id sum_weak that is a sum of the d-axis current instructions by a magnetic field weakening control based on the voltage instruction values vq1, vd1, vq2, and vd2 in each system.

The minimum value selector 442 selects a smaller one of (i) an id* sum that is a sum of the d-axis current instructions calculated by the torque-id sum map 432, and (ii) the id sum_weak that is calculated by the field-weakening controller 49. Since both of the id* sum and the id sum_weak are a negative value, a negative value having a greater absolute value is selected from among the two. That is, when the id sum_weak becomes smaller than the id* sum according to an operation state of the motor 80, the field-weakening control is prioritized.

In the third embodiment, the torque restriction map used in the torque limiter 42, the torque-id sum map used in the torque→id sum calculator 432, and the iq sum, id sum-torque map used in the dq-axis current sum→torque calculator 531 are all the same as the first embodiment.

The torque→iq sum calculator 431 receives an input of the id sum from the feedback current adder-subtractor 52, in addition to the torque instruction. Instead of inputting the id sum that is a detected current, a sum of the d-axis current instructions that are output from the torque→id sum calculator 432 to the minimum value selector 442 may be input. The torque→iq sum calculator 431 uses a torque, id sum-iq sum map shown in FIG. 16A, that is different from the maps shown in FIGS. 11A and 11B.

The map for the two-system driving mode in FIG. 16A and the map for the one-system driving mode in FIG. 16B respectively correspond to the iq sum, id sum-torque map shown in FIGS. 12A and 12B where the vertical and horizontal axes in FIGS. 12A and 12B are now the horizontal and vertical axes in FIGS. 16A and 16B. The iq sum may change based on the torque and the id sum. In FIG. 16A, a torque corresponding to the maximum iq sum for the id sum=0 [A] in the two-system driving mode is assumed as a 100% torque. In the one-system driving mode, a torque corresponding to the maximum iq1 for id1=0 [A] is a 50% torque. As the id sum decreases toward −40, −80 [A] (i.e., as the absolute value increases) in the two-system driving mode, and, as the id1 decreases toward −20, −40 [A] in the one-system driving mode, the iq sum and the iq1 correspond to the same torque device.

Fourth Embodiment

Figure 17:
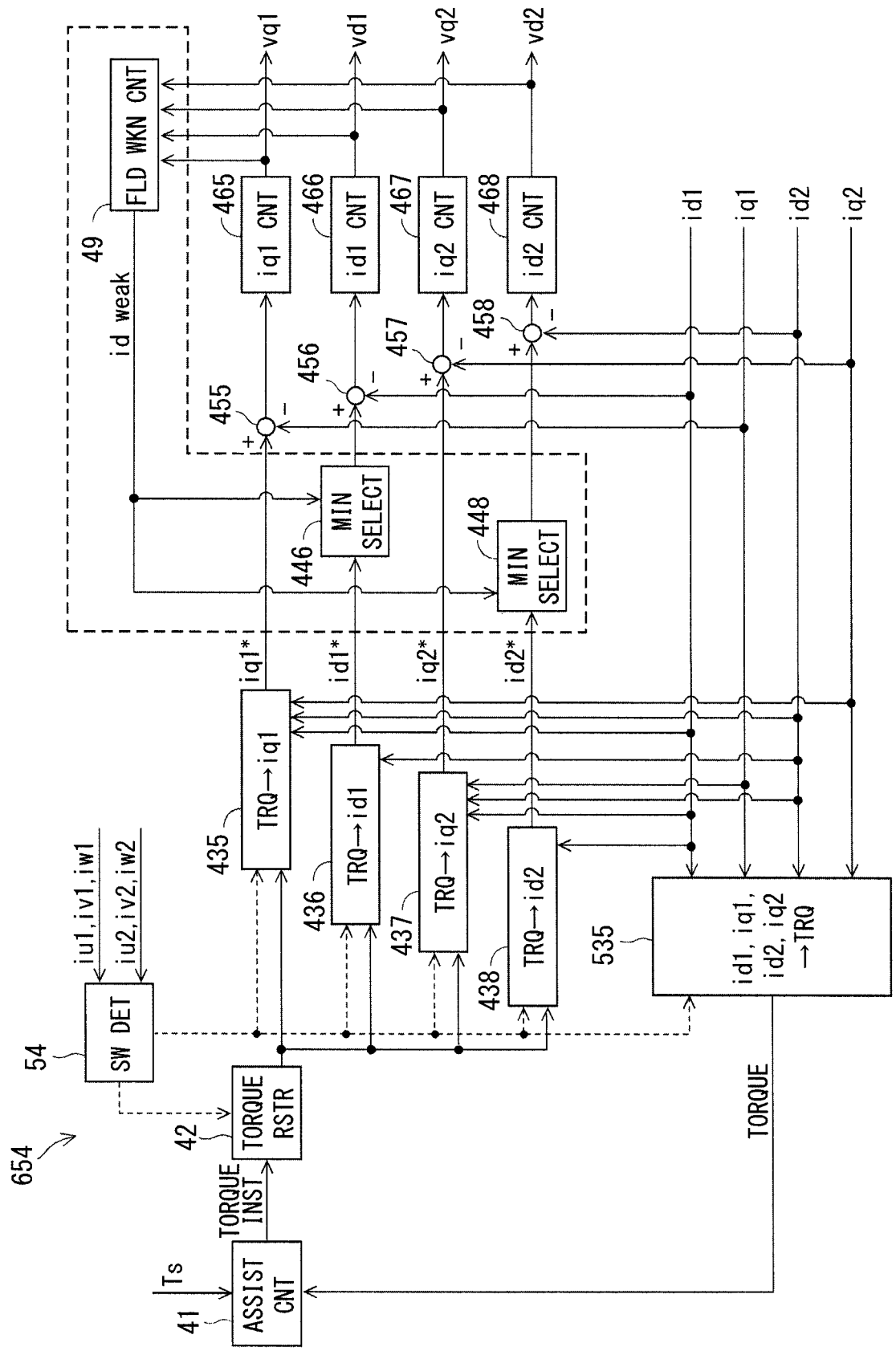
FIG. 17 is a block diagram of a control section in a fourth embodiment of the present disclosure.

With reference to FIG. 17, the fourth embodiment of the present disclosure is described. A control section 654 in the fourth embodiment performs feedback control of the d-axis currents id1, id2 and the q-axis currents iq1, iq2, which flow in the two sets of windings 801 and 802, to the d-axis current instructions id*1, id*2 and the q-axis current instructions iq*1, iq*2 for each system. The torque restriction map used in the torque limiter 42 in the fourth embodiment is the same as the torque restriction map in the first embodiment. The control section 654 includes four torque current calculators 435, 436, 437, 438 corresponding to the q-axis currents and the d-axis currents in the two systems, four current deviation calculators 455, 456, 457, 458, and four control units 465, 466, 467, 468.

The torque-iq1 calculator 435 and the torque-id1 calculator 436 calculate first-system dq-axis current instructions iq*1 and id*1 by referring to the map and based on a post-restriction torque. The torque-iq2 calculator 437 and the torque-id2 calculator 438 calculate second-system dq-axis current instructions iq*2 and id*2 by referring to the map and based on the post-restriction torque.

The iq1 deviation calculator 455, the id1 deviation calculator 456, the iq2 deviation calculator 457, and the id2 deviation calculator 458 respectively calculate current deviations between the dq-axis current instructions iq*1, id*1, iq*2, id*2 and feedback currents iq1, id1, iq2 id2 in the two systems. The iq1 control unit 465, the id1 control unit 466, the iq2 control unit 467, and the id2 control unit 468 respectively calculate the dq-axis voltage instructions vq1, vd1, vq2, vd2 by the PI operation for bringing each current deviation closer to 0.

The torque-iq1 calculator 435 receives an input of the feedback currents id1, id2, iq2, i.e., the feedback currents other than the iq1. The torque-id1 calculator 436 receives an input of the d-axis current id2 in the other system. The torque-iq2 calculator 437 receives an input of feedback currents id1, id2, iq1, i.e., the feedback currents other than the iq2. The torque-id2 calculator 438 receives an input of the d-axis current id1 in the other system.

The torque-iq1 calculator 435 calculates the iq1 based on conditions "iq2=iq1 and the id sum=id1+id2" by referencing the torque-iq sum map of FIG. 16A in the two-system driving mode. That is, since the map output of FIG. 16A is the iq sum, "the iq sum/2" is considered as the iq1. Further, the torque-iq1 calculator 435 calculates the iq1 based on conditions "iq2=0 and the id sum=id1+id2" with reference to the torque-iq sum map of FIG. 16A in the one-system driving mode. Alternatively, the torque-iq1 calculator 435 calculates the iq1 from the torque-iq sum map of FIG. 16B. The same applies to the torque-iq2 calculator 437 except for the replacement of the iq1 with the iq2.

The torque-id1 calculator 436 calculates the id1 from the torque-id sum map of FIG. 14B in the two-system driving mode. That is, since the map output of FIG. 14B is the id sum, "the id sum−id2" is considered as the id1. The torque-id1 calculator 436 calculates, from the torque-id sum map of FIG. 14B, "the id sum−id2" as the id1 in the one-system driving mode in a similar manner. The same applies to the torque-id2 calculator 438 except for the replacement of the id1 with the id2.

The control section 654 includes a current-torque calculator 535 for each system that calculates a torque based on the feedback currents iq1, id1, iq2, id2 in the two systems. The current-torque calculator 535 for each system calculates a torque, by directly using the equation (2), instead of using the map.

The field-weakening controller 49 calculates a d-axis current instruction id_weak per system by the field-weakening control based on the voltage instruction values vq1, vd1, vq2, vd2 of each system, similar to the third embodiment. A minimum value selector 446 of the first system selects a smaller one of two values from among the d-axis current instruction id1* calculated by the torque-id1 map 436, and the id_weak calculated by the field-weakening controller 49. A minimum value selector 448 of the second system selects a smaller one of two values from among the d-axis current instruction id2* calculated by the torque-id2 map 438, and the id_weak calculated by the field-weakening controller 49. In such manner, the fourth embodiment achieves the same effects as those achieved by the third embodiment.

Other Embodiments

According to the above-described embodiments, the embedded-magnet-type rotating machine is described as a multiphase rotating electric machine that generates the total torque as a combination of the magnet torque and the reluctance torque. However, the surface-magnet-type rotating electric machine (e.g., surface-magnet-type electric motor) may also generate a minute/nominal amount of reluctance torque, and as such, it may be possible to apply the present disclosure to a controller of a surface-magnet-type rotating electric machine.

The characteristics diagrams and the maps shown in the drawings and described in the embodiments above are based on a calculation of certain conditions, e.g., setting certain/arbitrary values for the maximum current amplitude [A], the torque constant Kt [Nm/A], (Ld−Lq) [H], and (Md−Mq) [H]. When those arbitrary values are changed, the values calculated based on the diagrams and maps may also change. In other words, the core of the present disclosure may be understood as a switching of a power supply amount (e.g., per-system power supply amount) in the two-system driving mode and in the one-system driving mode without regard to a particular/specific value.

The torque-iq calculator and the torque-id calculator in each of the Is embodiments may perform the calculation operation for calculating the d-axis current instruction and the q-axis current instruction from the torque instruction by using equations, instead of referring to the map. In such case, the control section may be configured to switch to use at least one of the equation for calculating the d-axis current instruction from the torque instruction and the equation for calculating the q-axis current instruction from the torque instruction in the two-system driving mode and in the one-system driving mode.

The alternating currents output from the two inverters 601 and 602 to two sets of winding 801 and 802 may or may not be the alternating currents described in the embodiments above, that is, the currents having the same amplitude with a phase difference of (30±60×n) [deg], where n is an integer.

The configuration of the controller of the multiphase rotating electric machine is not strictly limited/restricted to the one described in the above embodiments. For example, in place of MOSFETs, the switching elements of the inverter may be other field-effect transistors, IGBT(s), and like switching components.

The controller of the multiphase rotating electric machine in the present disclosure may be applicable not only to a controller of an electric power steering assist motor, but may also be applicable as a controller of other three-phase motors, dynamos, and generators.

Although the present disclosure has been described in details in connection with embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A controller for controlling a power supply of a multiphase rotating electric machine with two sets of windings to generate a total torque as a combination of a magnet torque and a reluctance torque, the controller comprising:
   a first power converter configured to supply an alternating current to a first set of windings, wherein the first power converter and the first set of windings are configured to operate together as a first system;
   a second power converter configured to supply an alternating current to a second set of windings, wherein the second power converter and the second set of windings are configured to operate together as a second system; and
   a control section configured to control the power supply to the multiphase rotating electric machine to drive the multiphase rotating electric machine in one of
      a two-system driving mode, in which the first power converter supplies the alternating current to the first set of windings and the second power converter supplies the alternating to the second set of windings, and a one-system driving mode, in which one of the first power converter or the second power converter supplies the alternating current to the corresponding first set of windings or second set of windings, wherein the control section is further configured to change at least one of a maximum amplitude of the alternating current and a current phase of the alternating current when driving the multiphase rotating electric machine in the one-system driving mode.

2. The controller of claim 1, wherein
the control section is further configured to set the maximum amplitude of the alternating current in the one-system driving mode to a value that is greater than 50% of a maximum amplitude of the alternating current in the two-system driving mode.

3. The controller of claim 2, wherein
the control section is further configured to set a torque restriction value of a torque instruction or a current restriction value in the one-system driving mode to a value that is greater than 50% of a torque restriction value or a current restriction value in the two-system driving mode.

4. The controller of claim 1, wherein
the control section is further configured to change the phase of the alternating current in the one-system driving mode by changing an amount of the d-axis current and an amount of the q-axis current.

5. The controller of claim 2, wherein
the control section is configured to switch at least one of a calculation operation of the d-axis current instruction or the q-axis current instruction from the torque instruction in the two-system driving mode and in the one-system driving mode.

6. The controller of claim 5, wherein
the control section is further configured to perform a calculation operation of the d-axis current instruction or the q-axis current instruction from the torque instruction by referring to a map, and the control section is further configured to switch at least one of a torque d-axis current map and a torque—q-axis current map in the two-system driving mode and in the one-system driving mode.

7. The controller of claim 6, wherein
the control section is further configured to perform a feedback control by feeding back a sum and a difference of a d-axis current and a q-axis current flowing in the first set of windings and the second set of windings to a d-axis current instruction and to a q-axis current instruction in the first system and the second system, and wherein the torque—d-axis current map is used to calculate the sum of the d-axis currents in the first system and the second system from the torque instruction, and wherein the torque—q-axis current map is used to calculate the sum of the d-axis currents in the first system and the second system from the torque instruction.

8. The controller of claim 6, wherein
the control section is further configured to perform a feedback control by feeding back a d-axis current and a q-axis current flowing in the first set of windings and the second set of windings to a d-axis current instruction and to a q-axis current instruction of each system, and wherein the control section is further configured to switch at least one of the torque—d-axis current map and the torque—q-axis current map based on at least one of the d-axis current instruction and the q-axis current instruction of the first system and the second system.

9. The controller of claim 1, wherein
the controller controls the power supply to the multiphase rotating electric machine in an electric power steering device of a vehicle.

* * * * *